(12) United States Patent
Urtel et al.

(10) Patent No.: US 7,989,537 B2
(45) Date of Patent: Aug. 2, 2011

(54) MOULDING COMPOUND COMPRISING POLYOXYMETHYLENE AND ZEOLITE

(75) Inventors: Melanie Urtel, Edingen-Neckarhausen (DE); Ulrich Müller, Neustadt (DE); Wolfgang Sauerer, Birkenheide (DE); Jens Aβmann, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 657 days.

(21) Appl. No.: 11/813,940

(22) PCT Filed: Jan. 10, 2006

(86) PCT No.: PCT/EP2006/050121
§ 371 (c)(1),
(2), (4) Date: Jul. 13, 2007

(87) PCT Pub. No.: WO2006/074997
PCT Pub. Date: Jul. 20, 2006

(65) Prior Publication Data
US 2008/0085968 A1    Apr. 10, 2008

(30) Foreign Application Priority Data
Jan. 13, 2005 (DE) .......... 10 2005 001 793

(51) Int. Cl.
*C08K 3/34* (2006.01)
(52) U.S. Cl. .......... 524/450; 524/444; 524/593
(58) Field of Classification Search .......... 524/450
See application file for complete search history.

(56) References Cited

U.S. PATENT DOCUMENTS

| | | | |
|---|---|---|---|
| 3,960,984 A | 6/1976 | Kohan | |
| 4,000,100 A * | 12/1976 | Baldyga | 524/147 |
| 4,148,846 A | 4/1979 | Owens et al. | |
| 4,360,617 A | 11/1982 | Muller et al. | |
| 4,396,742 A | 8/1983 | Binsack et al. | |
| 4,517,319 A | 5/1985 | Reske et al. | |
| 4,873,289 A | 10/1989 | Lindner et al. | |
| 4,978,725 A | 12/1990 | Reske et al. | |
| 5,710,189 A | 1/1998 | Brandt | |
| 5,814,688 A | 9/1998 | Hilti et al. | |
| 5,847,017 A | 12/1998 | Brandt | |
| 5,955,517 A | 9/1999 | Hilti et al. | |
| 6,590,020 B1 | 7/2003 | Eberle et al. | |
| 6,753,363 B1 | 6/2004 | Harashina et al. | |
| 2004/0010064 A1 | 1/2004 | Harashina et al. | |

FOREIGN PATENT DOCUMENTS

| | | |
|---|---|---|
| DE | 2702661 A1 | 8/1977 |
| EP | 50265 A1 | 4/1982 |
| EP | 0 115 846 A2 | 8/1984 |
| EP | 0 115 847 A2 | 8/1984 |
| EP | 0117664 A1 | 9/1984 |
| EP | 208187 A2 | 1/1987 |
| EP | 0288063 A2 | 10/1988 |
| EP | 0789049 A1 | 8/1997 |
| EP | 1264858 A1 | 12/2002 |
| JP | 07062142 A * | 3/1995 |
| JP | 07310226 A | 11/1995 |
| JP | 11347789 A | 12/1999 |
| JP | 2001072830 A | 3/2001 |
| JP | 2002212384 A | 7/2002 |
| JP | 2002519466 T | 7/2002 |

OTHER PUBLICATIONS

Machine translation of JP 07-062142 A, Mar. 7, 1995.*
Rompp Chemie-Lexikon [Rompp's Chemical Encyclopedia], Georg Thieme Verlag, 10th edition 1999, vol. V, pp. 3490-3491 and 3406-3407.
H. Zweifel (editor), "Plastics Additives Handbook", 5th edition, Hanser Verlag, Munich & Cincinnati, 2001, chapter 18 "Nucleating Agents for Semicrystalline Polymers", pp. 949-971.
Kunststoffhandbuch 3/1, "Polycarbonate, Polyacetale, Polyester, Celluloseester" [Polycarbonates, polyacetals, polyesters, cellulose esters], Hanser Verlag, Munich & Vienna, 1992, pp. 320-324.

* cited by examiner

*Primary Examiner* — Vickey Nerangis
(74) *Attorney, Agent, or Firm* — Connolly Bove Lodge & Hutz LLP

(57) ABSTRACT

The present invention relates to a molding composition, comprising from 10 to 99.999% by weight of at least one polyoxymethylene as component (A1) and from 0.001 to 10% by weight, based on the weight of component (A1) present in the molding composition, of at least one zeolitic material whose pore diameter is in the range from 0.3 to 0.5 nm, determined to DIN 66134 and DIN 66135, where the size of the particles of the zeolitic material is in the range from 3 to 7 μm, determined to ISO 13320, and also to moldings that can be produced from this molding composition.

24 Claims, 9 Drawing Sheets

MOULDING COMPOUND COMPRISING POLYOXYMETHYLENE AND ZEOLITE

RELATED APPLICATIONS

This application is a national stage application (under 35 U.S.C. §371) of PCT/EP2006/050121 filed Jan. 10, 2006, which claims benefit of German application 10 2005 001 793.2 filed Jan. 13, 2005.

BACKGROUND OF THE DISCLOSURE

1. Field of the Disclosure

The present invention relates to molding compositions, in particular to thermoplastic molding compositions which comprise polyoxymethylene polymer and zeolitic material. The inventive molding compositions may also comprise other constituents, such as thermoplastic polyurethanes. The present invention further relates to the preparation of the molding compositions mentioned. The present invention also relates to the use of zeolitic material as a constituent of a polyoxymethylene-containing molding composition in order to reduce formaldehyde emission. The present invention particularly preferably relates to polyoxymethylene-containing molding compositions in which the formaldehyde scavenger present comprises exclusively zeolitic material.

2. Description of the Related Art

Polyoxymethylene polymers are generally prepared via polymerization of formaldehyde or trioxane, preferably in the presence of suitable catalysts (see, by way of example, Römpp Chemie-Lexikon [Römpp's Chemical Encyclopedia], Georg Thieme Verlag, 10$^{th}$ edition 1999, vol. V, pages 3490, and 3406-3407).

EP 0 789 049 A1 describes polymers which have been rendered antistatic, the polymers described comprising—alongside many others—polyacetals, such as polyoxymethylene. These polymers also comprise a polar adsorptive inorganic or organic material Zeolites are mentioned as inorganic material—again alongside many others. Preferred particle sizes for these zeolites are in the range from 50 to 500 µm. None of the examples of that specification discloses compositions which comprise zeolitic material.

U.S. Pat. No. 6,753,363 B1 describes a polyacetal resin composition which has flame-retardant action via a combination composed of phosphorus-containing compound and of basic nitrogen compound. The description says that the compositions may comprise a large number of additives, such as antioxidants, e.g. hindered phenols, light stabilizers, or heat stabilizers. Again, a large number of compounds is disclosed as heat stabilizers, examples among which are metal salts of organic acids, hydroxides of metals, silicates, zeolites, and hydrotalcites. In relation to the zeolites, in tam, a number of different structural types are described, examples being zeolites of types A, X, Y, L or ZSM. Particularly preferred zeolite contents of the polyacetal resin compositions are in the range from 1 to 10 parts by weight, based on 100 parts by weight of polyacetal. Only a single example in U.S. Pat. No. 6,753,363 B1 describes a polyacetal resin composition which comprises not only a hindered phenol but also a zeolite as heat stabilizer, the ratio by weight of zeolite to phenol being 14:1. The description of U.S. Pat. No. 6,753,363 B1 also says that the basic nitrogen compound, in combination with in particular the antioxidant, inhibits formaldehyde production.

EP 0 288 063 A2 describes an antibiotic polymer resin which comprises an antibiotic zeolite. Some or all of the replaceable ions in this zeolite have been replaced by ammonium ions or by antibiotic metal ions, e.g. silver, copper, zinc, mercury, tin, lead, bismuth, cadmium, chromium, or thallium. According to one example of EP 0 288 063 A2, 1 part by weight of the antibiotic zeolite is used per 100 parts by weight of the resin.

EP 1 264 858 A1 describes a polyacetal resin composition which has high thermal stability and very low formaldehyde emission. This very low formaldehyde emission is achieved via the use of a specific combination composed of polyacetal resin, hindered phenol, a light-resistant stabilizer, and a spiro compound which comprises a triazine ring. The compositions according to EP 1 264 858 A1 can also comprise heat stabilizers. Alongside a large number of possible heat stabilizers, zeolites are described by way of example having structure of types A, X, Y, L, or ZSM.

US 2004/0010064 A1, like EP 1 264 858 A1, also describes polyacetal resin compositions in which the heat stabilizer present may comprise—alongside many others—a zeolite, by way of example. However, none of the examples discloses a composition comprising a zeolite.

EP 0 789 049 A1 describes polymers which have been rendered antistatic and which comprise, alongside a thermoplastic, structurally crosslinked elastomeric or thermoset polymer, either a polar adsorptive inorganic material or a polar adsorptive organic material, and also at least one polar organic compound having at least 5 carbon atoms and at least 3 heteroatoms and, furthermore, the sat of an inorganic proton acid. Examples of polar adsorptive inorganic materials are, alongside many others, zeolites. Preferred particle sizes for the polar adsorptive inorganic materials are in the range from 50 to 500 µm. Further preference is given to particles which are non-spherical. Accordingly, the adsorptive materials used in the examples of EP 0 789 049 A1 comprise exclusively fibers.

U.S. Pat. Nos. 5,710,189 and 5,847,017 describe a blowing agent composition which comprises a molecular sieve and a foam-former. U.S. Pat. Nos. 5,710,189 and 5,847,017 also describe a foamable mixture composed of resin and blowing agent composition. A feature of the composition is that two molecular sieves of different pore sizes are combined, and the first molecular sieve here serves to absorb molecules such as water and ammonia, and the second molecular sieve comprises the blowing agent intended to foam the resin.

DESCRIPTION THE DISCLOSURE

Certain thermal and mechanical properties are desirable in many usage forms of molding compositions or of moldings based on polyoxymethylene, examples being high thermal stability, high stiffness, high tensile modulus of elasticity, and/or high yield stress.

Another factor desirable with a view to low-cost preparation of the molding compositions is good nucleation and therefore high crystallization rate of a polyoxymethylene polymer composition.

A particularly significant criterion for the suitability of molding compositions or of moldings in the food or drinks sector, in the household sector, in the house construction sector, in particular in house interiors, in the automotive construction sector, in particular in relation to parts installed in automotive interiors, or in the medical sector, is formaldehyde emission. For reasons of toxicology, too, it is desirable to minimize the formaldehyde emission of the moldings or molding compositions thus used. According to the prior art, this is achieved by adding specific constituent compounds to the polyoxymethylene-containing molding compositions or moldings, which react chemically with formaldehyde and remove it from the molding composition or the molding via a chemical conversion process. However, these additives can cause impairment of the properties of the polymer, e.g. of mechanical and thermal stability, and can also cause discoloration and fogging. Another disadvantage is seen in the fact that the products formed via chemical reaction remain within the system, a factor which can likewise lead to the impairments mentioned, or have to be removed from the system by a complicated process.

BRIEF SUMMARY OF THE DISCLOSURE

One of the objects underlying the present invention was therefore to provide novel molding compositions and moldings which have at least one of the above mentioned advantageous properties.

Another object underlying the present invention was in particular to provide novel molding compositions and moldings which have very low formaldehyde emissions, achievable in a simple manner.

Another object underlying the present invention was in particular to provide a novel molding composition which has very low formaldehyde emission achievable in a simple manner and at the same time has high thermal stability.

DETAILED DESCRIPTION OF THE BEST AND VARIOUS EMBODIMENTS

The present invention therefore provides a molding composition, comprising from 10 to 99.999% by weight of at least one polyoxymethylene as component (A1) and from 0.001 to 10% by weight, based on the weight of component (A1) present in the molding composition, of at least one zeolitic material whose pore diameter is in the range from 0.3 to 0.5 nm, determined to DIN 66134 and DIN 66135, where the size of the particles of the zeolitic material is in the range from 3 to 7 µm, determined to ISO 13320.

The standard ISO 13320, referred to for the purposes of the present invention, is the 1999-11-01 version of the standard. The dispersion medium used to determine particle size comprised deionized water. The apparatus used comprised a Malvern Mastersizer 2000 (Hydro 2000 G module). The specimens were prepared with solids content of from 1 to 2% by weight in water and this was followed by stirring with a magnetic stirrer for 1 min. The particle size was defined as the size of the particles at 50% transit.

The term "zeolitic material" used for the purposes of the present invention means crystalline aluminosilicates having ordered channel structures and ordered cage structures. The network of these zeolites is composed of $SiO_4^-$ and $AlO_4^-$ tetrahedra, bonded by way of the commonly-held bridging oxygen atoms. An example of an overview of t known structures is found in M. W. Meier, D. H. Olson, Ch. Baerlocher "Atlas of Zeolite Structure Types" $5^{th}$ revised edition, Elsevier, London, 2001. Another list is accessible by way of the Internet at the URL http://topaz.ethz.ch/IZA-SC/SearchRef.htm, where the following structures, inter alia, are described: ABW, ACO, AEI, AEL, AEN, AET, AFG, AFL, AFN, AFO, AFR, AFS, AFT, AFX, AFY, AHT, ANA, APC, APD, AST, ASY, ATN, ATO, ATS, ATT, ATV, AWO, AWW, BCT, BEA, BEC, BIX, BOG, BPH, BRE, CAN, CAS, CDO, CPL CGF, CGS, CHA, CHI, CLO, CON, CZP, DAC, DDR, DFO, DFT, DOH, DON, EAB, EDI, EMT, EPI, ERI, ESV, ETR, EUO, FAU, FER, FRA, GIS, GIU, GME, GON, GOO, HEU, IFR, ISV, ITE, ITH, ITW, IWR, IWW, JBW, KFI, LAU, LEV, LIO, LOS, LOV, LTA, LTL, LTN, MAR, MAZ, MEL, MEL, MEP, MER, MFI, MFS, MON, MOR, MSO, MTF, MTN, MTT, MTW, MWW, NAB, NAT, NES, NON, NPO, OBW, OFF, OSI, OSO, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SSY, STF, STL STT, TER, THO, TON, TSC, UEI, UFI, UFI, UTL, VET, VFI, VNI, VSV, WLE, WEN, YNU, YUG, or ZON.

To compensate the negative electrovalency produced via incorporation of Al(III) into the Si(IV) silicate lattice, replaceable cations are found in zeolitic materials. Particular examples of these—depending on the process for preparation of the zeolitic material—are cations of sodium, of potassium, of lithium, or rubidium, or of cesium. Ammonium ions, too, can be present as cations in the zeolitic material. If these cations are replaced by protons, e.g. via ion exchange, the product is the corresponding materials in what is known as the acid form, the H form.

The pore diameter of the zeolitic material is preferably in the range from 0.31 to 0.49 nm, more preferably in the range from 0.32 to 0.48 nm, more preferably in the range from 0.33 to 0.47 nm, more preferably in the range from 0.34 to 0.46 nm, and particularly preferably in the range from 0.35 to 0.45 nm. By way of example, particularly preferred pore diameters are 0.36 nm, or 0.37 nm, or 0.38 nm, or 0.39 nm, or 0.40 nm, or 0.41 nm, or 0.42 nm, or 0.43 dm, or 0.44 nm.

The present invention therefore also provides a molding composition described above, where the pore diameter of the zeolitic material is in the range from 0.37 to 0-43 nm.

The particle size of the zeolitic material is preferably in the range from 3.1 to 6.9 µm, more preferably in the range from 3.2 to 6.8 µm, more preferably in the range from 3.3 to 6.7 µm, more preferably in the range from 3.4 to 6.6 µm more preferably in the range from 3.5 to 6.5 µm, more preferably in the range from 3.6 to 64 µm, more preferably in the range from 3.7 to 6.3 µm, more preferably in the range from 3.8 to 6.2, more preferably in the range from 3.9 to 6.1 µm, and particularly preferably in the range from 4.0 to 6.0 µm.

The present invention therefore also provides a molding composition described above, where the size of the particles of the zeolitic material is in the range from 4 to 6 µm, determined to ISO 13320.

By way of example, particularly preferred particle sizes of the zeolitic material are 4.1 µm, or 4.2 µm, or 4.3 µm, or 4.4 µm, or 4.5 µm, or 4.6 µm, or 4.7 µm, or 4.8 µm, or 4.9 µm, or 5.0 µm, or 5.1 µm, or 5.2 µm, or 5.3 µm, or 5.4 µm, or 5.5 µm or 5.6 µm, or 5.7 µm, or 5.8 µm, or 5.9 µm.

One particularly preferred embodiment of the inventive molding composition comprises a zeolitic material whose pore diameter is in the range from 0.35 to 0.45 nm, more preferably in the range from 0.36 to 0.44 nm, and more preferably in the range from 0.37 to 0.43 nm, where the particle size is in the range from 3.5 to 6.5 µm, more preferably in the range from 3.6 to 6.4 µm, more preferably in the range from 3.7 to 6.3 µm, more preferably in the range from 3.8 to 6.2 µm, more preferably in the range from 3.9 to 6.1 µm, and in particular in the range from 4.0 to 6.0 µm.

The inventive molding composition therefore very particularly preferably comprises a zeolitic material whose pore diameter is in the range from 0.37 to 0.43 nm, and whose particle size is in the range from 4.0 to 6.0 µm.

In principle, the molding compositions of the present invention can possibly comprise a single zeolitic material or two, three, four, or more mutually differing zeolitic materials, as long as at least one zeolitic material has the specifications described above with respect to pore diameter and particle size. In principle, the invention also comprises embodiments according to which the molding composition comprises at least two mutually different zeolitic materials, where at least one zeolitic material has the abovementioned specifications with respect to pore diameter and particle size, and at least one other zeolitic material has either a pore diameter different therefrom or a particle size different therefrom, or has both a pore diameter different therefrom and a particle size different therefrom.

The present invention therefore comprises molding compositions which comprise at least one zeolitic material whose pore diameter is in the range from 0.3 to 0.5 nm, determined to DIN 66134 and DIN 66135, where the size of the particles of the zeolitic material is in the range from 3 to 7 μm, determined to ISO 13320, and where the molding composition also comprises at least one other zeolitic material different therefrom whose particle size is in the range from 3 to 7 μm and whose pore diameter is smaller than 0.3 nm or greater than 0.5 nm, or whose pore diameter is in the range from 0.3 to 0.5 nm and whose particle size is smaller than 3 μm or greater than 7 μm, or whose pore diameter is smaller than 0.3 nm or greater than 0.5 nm, and whose particle size is smaller than 3 μm or greater than 7 μm. The latter embodiment therefore comprises molding compositions which comprise at least one zeolitic material, whose pore diameter is in the range from 0.3 to 0.5 nm, determined to DIN 66134 and DIN 66135, where the size of the particles of the zeolitic material is in the range from 3 to 7 μm, determined to ISO 13320, and which also comprise at least one other zeolitic material whose pore diameter is smaller than 0.3 nm and whose particle size is smaller than 3 μm, or whose pore diameter is smaller than 0.3 nm and whose particle size is greater than 7 μm, or whose pore diameter is greater than 0.5 nm and whose particle size is smaller than 3 μm, or whose pore diameter is greater than 0.5 nm and whose particle size is greater than 7 μm.

If the inventive molding composition comprises two or more different zeolitic materials, and the pore diameter of each of these materials is in the range from 0.3 to 0.5 nm, determined to DIN 66134 and DIN 66135, where the size of the particles of the zeolitic material is in the range from 3 to 7 μm determined to ISO 13320, these zeolitic materials may differ either with respect to pore diameter or else with respect to particle size, or else with respect to pore diameter and particle size.

One preferred embodiment of the inventive molding composition comprises no zeolitic material other than at least one zeolitic material whose pore diameter is in the range from 0.3 to 0.5 nm, determined to DIN 66134 and DINT 66135, where the size of the particles of the zeolitic material is in the range from 3 to 7 μm, determined to ISO 13320.

One particularly preferred embodiment of the inventive molding composition comprises no zeolitic material other than at least one, zeolitic material whose pore diameter is in the range from 0.37 to 0.43 nm, determined to DIN 66134 and DIN 66135, where the size of the particles of the zeolitic material is in the range from 4 to 6 μm, determined to ISO 13320.

Another preferred embodiment of the inventive molding composition comprises, based on the weight of component (A1) present in the molding composition, an amount in the range from 0.002 to 9% by weight, more preferably in the range from 0.003 to 8% by weight, more preferably in the range from 0.004 to 7% by weight more preferably in the range from 0.005 to 6% by weight, more preferably in the range from 0.006 to 5% by weight, more preferably in the range from 0.007 to 4% by weight, more preferably in the range from 0.008 to 3% by weight, more preferably in the range from 0.009 to 2% by weight, more preferably in the range from 0.01 to 1% by weight, more preferably in the range from 0.02 to 0.9% by weight, more preferably in the range from 0.03 to 0.8% by weight, more preferably in the range from 0.04 to 0.7% by weight, more preferably in the range from 0.05 to 0.6% by weight, and particularly preferably in the range from 0.05 to 0.50% by weight, of the zeolitic material.

The present invention therefore also provides a molding composition described above, comprising from 0.05 to 0.50% by weight of the zeolitic material, based on the weight of component (A1) present in the molding composition.

Particularly prefer contents of zeolitic material in the inventive molding composition, based on the weight of component (A1) present in the molding composition are, by way of example, 0.05% by weight, 0.10% by weight, 0.15% by weight, 0.20% by weight, 0.25% by weight, 0.30% by weight, 0.35% by weight, 0.40% by weight, 0.45% by weight or 0.50% by weight.

One preferred embodiment of the inventive molding composition comprises from 0.05 to 0.50% by weight, based on the content of component (A1) in the molding composition, of at least one zeolitic material whose pore diameter is in the range from 0.3 to 0.5 nm, determined to DIN 66134 and DIN 66135, where the size of the particles of the zeolitic material is in the range from 3 to 7 μm, determined to ISO 13320.

Another preferred embodiment of the inventive molding composition comprises no zeolitic material other than from 0.05 to 0.50% by weight, based on the content of component (A1) in the molding composition, of at least one zeolitic material whose pore diameter is in the range from 0.3 to 0.5 nm determined to DIN 66134 and DIN 66135, where the size of the particles of the zeolitic material is in the range from 3 to 7 μm, determined to ISO 13320.

Another preferred embodiment of the inventive molding composition comprises from 0.05 to 0.50% by weight, based on the content of component (A1) in the molding composition, of at least one zeolitic material whose pore diameter is in the range from 0.37 to 0.43 nm, determined to DIN 66134 and DIN 66135, where the size of the particles of the zeolitic material is in the range from 4 to 6 μm, determined to ISO 13320.

A particularly preferred embodiment of the inventive molding composition comprises no zeolitic material other than from 0.05 to 0.50% by weight, based on the content of component (A1) in the molding composition, of at least one zeolitic material whose pore diameter is in the range from 0.37 to 0.43 nm, determined to DIN 66134 and DIN 66135, where the size of the particles of the zeolitic material is in the range from 4 to 6 μm, determined to ISO 13320.

The zeolitic material whose pore diameter is in the range from 0.3 to 0.5 nm and whose particle size is in the range from 3 to 7 μm, for example the preferred material whose pore diameter is in the range from 0.37 to 0.43 nm and whose particle size is in the range from 4 to 6 μm, may in principle have any molar Si:Al ratio, calculated as molar $SiO_2:Al_2O_3$ ratio.

The Si:Al ratio, calculated as molar $SiO_2:Al_2O_3$ ratio, is particularly preferably the range up to 5:1.

The present invention therefore also provides a molding composition described above, where the molar Si:Al ratio, calculated as molar $SiO_2:Al_2O_3$ ratio, of the zeolitic material is in the range up to 5:1.

The molar Si:Al ratio, calculated as molar. $SiO_2:Al_2O_3$ ratio, of the zeolitic material is preferably in the range from 0.9:1 to 5:1, more preferably in the range from 0.9:1 to 4:1, more preferably in the range from 0.9:1 to 3:1, more preferably in the range from 0.9:1 to 2:1, and particularly preferably in the range from 1:1 to 2:1. An example of a particularly preferred molar Si:Al ratio, calculated as molar $SiO_2:Al_2O_3$ ratio, is about 1:1.

One embodiment of the inventive molding composition comprises from 0.05 to 0.50% by weight, based on the content of component (A1) in the molding composition, of at least one zeolitic material whose pore diameter is in the range from 0.3 to 0.5 nm, determined to DIN 66134 and DIN 66135, where the size of the particles of the zeolitic material is in the range from 3 to 7 µm, determined to ISO 13320, and the molar Si:Al ratio, calculated as molar $SiO_2:Al_2O_3$ ratio, is in the range from 0.9:1 to 5:1.

Another embodiment of the inventive molding composition comprises no zeolitic material other than from 0.05 to 0.50% by weight, based on the content of component (A1) in the molding composition, of at least one zeolitic material whose pore diameter is in the range from 0.3 to 0.5 nm, determined to DIN 66134 and DIN 66135, where the size of the particles of the zeolitic material is in the range from 3 to 7 µm, determined to ISO 13320, and the molar Si:Al ratio calculated as molar $SiO_2:Al_2O_3$ ratio, is in the range from 0.9:1 to 5:1.

Another embodiment of the inventive molding composition comprises from 0.05 to 0.50% by weight, based on the content of component (A1) in the molding composition, of at least one zeolitic material whose pore diameter is in the range from 0.37 to 0.43 nm, determined to DIN 66134 and DIN 66135, where the sire of the particles of the zeolitic material is in the range from 4 to 6 µm, determined to ISO 13320, and the molar Si:Al ratio, calculated as molar $SiO_2:Al_2O_3$ ratio, is in the range from 0.9:1 to 2:1.

Another embodiment of the inventive molding composition comprises no zeolitic material other than from 0.05 to 0.50% by weight, based on the content of component (A1) in the molding composition, of at least one zeolitic material whose pore diameter is in the range from 0.37 to 0.43 nm, determined to DIN 66134 and DIN 66135, where the size of the particles of the zeolitic material is in the range from 4 to 6 µm, determined to ISO 13320, and the molar Si:Al ratio, calculated as molar $SiO_2:Al_2O_3$ ratio, is in the range from 0.9:1 to 2:1.

The particle sizes described above in the range from 3 to 7 µm, determined to ISO 13320, for the zeolitic material may in principle represent the size of primary crystals of the zeolitic material, or the size of secondary structures formed from these primary crystals. In principle, therefore, the sizes of the primary crystals of the zeolitic material, determined by SEM, may differ from the particle sizes determined to ISO 13320.

According to one preferred embodiment of the present invention, the average sizes of the primary crystals of the zeolitic material whose pore diameter is in the range from 0.3 to 0.5 nm, determined to DIN 66134 and DIN 66135, and whose particle size is in the range from 3 to 7 µm, determined to ISO 13320, where the sizes of the primary crystals are determined by way of SEM, are below the particle sizes.

The average sizes of the primary crystals of the zeolitic material whose pore diameter is in the range from 0.3 to 0.5 nm, determined to DIN 66134 and DIN 66135, and whose particle size is in the range from 3 to 7 µm, determined to ISO 13320, are particularly preferably in the range up to 3 µm, more preferably in the range from 1.5 to 3.0 µm, more preferably in the range from 1.75 to 2.75 µm, and particularly preferably in the range from 2.0 to 2.5 µm, in each case determined by way of SEM.

The term "size of the primary crystals" as used for the purposes of the present invention means the diameter of the crystals when primary crystals are approximately spherical, and means the length of the longest edge of the crystals when these have approximately the shape of a parallelepiped.

A further preference is that the size of at least 90%, more preferably at least 91%, more preferably at least 92%, more preferably at least 93%, more preferably at least 94%, and particularly preferably at least 95%, of the primary crystals of the zeolitic material whose pore diameter is in the range from 0.3 to 0.5 nm, determined to DIN 66134 and DIN 66135, and whose particle size is in the range from 3 to 7 µm, determined to ISO 13320, is in the range from 1.5 to 3.0 µm, determined by way of SEM.

A further preference is that the size of at least 90%, more preferably at least 91%, more preferably at least 92%, more preferably at least 93%, more preferably at least 94%, and particularly preferably at least 95%, of the primary crystals of the zeolitic material whose pore diameter is in the range from 0.3 to 0.5 nm, determined to DIN 66134 and DIN 66135, and whose particle size is in the range from 3 to 7 µm, determined to ISO 13320, is in the range from 1.75 to 2.75 µm, determined by way of SEM.

The present invention therefore also provides a molding composition described above, where the size of at least 90% of the pry crystals of the zeolitic material is in the range from 1.5 to 3.0 µm, determined by way of SEM.

One embodiment of the inventive molding composition comprises from 0.05 to 0.50% by weight, based on the content of component (A1) in the molding composition, of at least one zeolitic material whose pore diameter is in the range form 0.3 to 0.5 nm, determined to DIN 66134 and DIN 66135, where the size of the particles of the zeolitic material is in the range from 3 to 7 µm, determined to ISO 13320, where the size of at least 90% of the primary crystals of the zeolitic material is in the range from 1.5 to 3.0 µm, determined by way of SEM, and the molar Si:Al ratio, calculated as molar $SiO_2:Al_2O_3$ ratio, is in the range from 0.9:1 to 5:1.

Another embodiment of the inventive molding composition comprises no zeolitic material other than from 0.05 to 0.50% by weight, based on the content of component (A1) in the molding composition, of at least one zeolitic material whose pore diameter is in the range from 0.3 to 0.5 µm, determined to DIN 66134 and DIN 66135, where the size of the particles of the zeolitic material is in the range from 3 to 7 µm, determined to ISO 13320, where the size of at least 90% of the primary crystals of the zeolitic material is in the range from 1.5 to 3.0 µm, determined by way of SE-M, and the molar Si:Al ratio, calculated as molar $SiO_2:Al_2O_3$ ratio, is in the range from 0.9.1 to 5:1.

Another embodiment of the inventive molding composition comprises from 0.05 to 0.50% by weight, based on the content of component (A1) in the molding composition, of at least one zeolitic material whose pore diameter is in the range from 0.37 to 0.43 nm, determined to DIN 66134 and DIN 66135, where the size of the particles of the zeolitic material is in the range from 4 to 6 µm, determined to ISO 13320, where the size of at least 95% of the primary crystals of the zeolitic material is in the range from 1.75 to 2.75 µm, determined by way of SEM, and the molar Si:Al ratio, calculated as molar $SiO_2:Al_2O_3$ ratio, is in the range from 0.9:1 to 2:1.

Another embodiment of the inventive molding composition comprises no zeolitic material other than from 0.05 to 0.50% by weight, based on the content of component (A1) in the molding composition, of at least one zeolitic material whose pore diameter is in the range from 0.37 to 0.43 nm, determined to DIN 66134 and DIN 66135, where the size of the particles of the zeolitic material is in the range from 4 to 6 µm, determined to ISO 13320, where the size of at least 95% of the primary crystals of the zeolitic material is in the range from 1.75 to 2.75 μm, determined by way of SEM, and the molar Si:Al ratio, calculated as molar $SiO_2:Al_2O_3$ ratio, is in the range from 0.9:1 to 2:1.

According to one particularly preferred embodiment, at least 75% by weight of the zeolitic material present is not in the H form. This content is based in particular on the zeolitic material whose pore diameter is in the range from 0.3 to 0.5 nm, determined to DIN 66134 and DIN 661357 and whose particle size is in the range from 3 to 7 μm, determined to ISO 13320, but also, if appropriate, includes zeolitic material different therefrom, as described above.

The present invention therefore also provides a molding composition as described above, where at least 75% by weight of the zeolitic material is not present in the H form.

A further preference is that at least 80% by weight, more preferably at least 85% by weight, more preferably at least 90% by weight, more preferably at least 95% by weight, more preferably at least 96% by weight, more preferably at least 97% by weight, more preferably at least 98% by weight, and particularly preferably at least 99% by weight, of the zeolitic material in the molding composition is not present in the H form.

The present invention therefore also provides a molding composition described above, where the zeolitic material whose pore diameter is in the range from 0.3 to 0.5 nm, determined to DIN 66134 and DIN 66135, where the size of the particles of the zeolitic material is in the range from 3 to 7 μm, determined to ISO 13320, has a molar Si:Al ratio, calculated as molar $SiO_2:Al_2O_3$ ratio, in the range from 0.9:1 to 2:1, the size of at least 95% of the primary crystals of the zeolitic material is in the range from 1.75 to 2.75 μm, determined by way of SEM, and at least 95% by weight of tee zeolitic material is not present in the H form.

Suitable zeolitic materials are in principle any of the materials which comply with the specifications described above.

The invention particularly prefers zeolitic materials whose structures allocated by X-ray diffraction belong to the following types: BEA, FER, FAU, LTA, MEL, MFL or MOR. Mention should also be made of mixed structures composed of two or more of these types, an example being a zeolitic material having mixed MEL/MFI structure. A zeolitic material of LTA type is particularly preferred, inter alia.

The present invention therefore also describes a molding composition described above which comprises, as zeolitic material, a material of structural type LTA whose pore diameter is in the range from 0.3 to 0.5 nm, determined to DIN 66134 and DIN 66135, where the size of the particles of the zeolitic material is in the range from 3 to 7 μm, determined to ISO 13320, where preferably the size of at least 90% of the primary crystals of the zeolitic material is in the range from 1.5 to 3.0 μm) determined by way of SEM, and/or the molar Si:Al ratio, calculated as molar $SiO_2:Al_2O_3$ ratio, is in the range from 0.9:1 to 5:1.

According to another preferred embodiment of the present invention, the zeolitic material as described above has 8-ring channels. A further preference is that the zeolitic material in essence has 8-ring channels. It is particularly preferable that the zeolitic material as described above has in essence no 10-ring channels and/or no 12-ring channels.

The present invention therefore also describes a molding composition described above, in particular a molding composition which comprises from 0.05 to 0.50% by weight, based on the content of component (A1) in the molding composition, of at least one zeolite material whose pore diameter is in the range from 0.3 to 0.5 nm, determined to DIN 66134 and DIN 66135, where the size of the particles of the zeolitic material is in the range from 3 to 7 μm, determined to ISO 13320, and where the channels of the zeolitic material in essence comprise 8-ring channels.

The inventive, molding composition comprises at least one polyoxyethylene as component (A1).

The term "polyoxymethylene" as used for the purposes of the present invention means not only a polyoxymethylene homopolymer but also a polyoxymethylene copolymer.

The present invention therefore also provides a molding composition described above, comprising from 10 to 99.999% by weight of at least one polyoxymethylene, where the at least one polyoxymethylene is at least one polyoxymeylene homopolymer or at least one polyoxymethylene copolymer, or a mixture composed of at least one polyoxymethylene homopolymer and at least one polyoxymethylene copolymer.

For the purposes of the present invention, the term "polyoxymethylene homopolymer" means polymers which have only —$CH_2O$— repeat monomer units.

For the purposes of the present invention, e term "polyoxymethylene copolymer" means polymers which alongside the —$CH_2O$— monomer units also have at least one other unit preferably at least one other repeat unit. These polymers preferably have at least 50 mol % of —$CH_2O$— repeat units in the main polymer chain.

The present invention prefers polyoxymethylene copolymers, in particular those which also comprise, alongside the —$CH_2O$— repeat units, up to 50 mol %, more preferably up to 40 mol %, more preferably up to 30 mol %, more preferably up to 20 mol %, more preferably from 0.01 to 20 mol %, more preferably from 0.1 to 10 mol %, more preferably from 0.2 to 5 mol %, and particularly preferably from 0.5 to 3 mol %, of

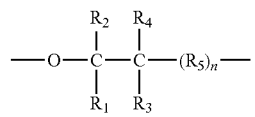

repeat units. The radicals $R_1$, $R_2$, $R_3$, and $R_4$ here may be identical or different from one another and, independently of one another, are H, a $C_1$-$C_4$-alkyl group, such as a methyl group, an ethyl group, a propyl group, e.g. an n-propyl group or an isopropyl group, or a butyl group, e.g. an n-butyl group, isobutyl group, or tert-butyl group, or a halogen-substituted $C_1$-$C_4$-alkyl group, such as a halogen-substituted methyl group, ethyl group, propyl group, e.g. an n-propyl group or an isopropyl group, or butyl group, e.g. an n-butyl group, isobutyl group, or tert-butyl group, where, if two or more halogen substituents are present, these may be identical or different from one another, and where the halogen may, by way of example, be P, Cl, Br, or I, and where $R_5$ is a methylene group —$CH_2$—, an oxymethylene group —$CH_2O$—, a $C_1$-$C_4$-alkyl- or $C_1$-$C_4$-haloalkyl-substituted methylene group, or a $C_1$-$C_4$-alkyl- or $C_1$-$C_4$-haloalkyl-substituted oxymethylene group, where the $C_1$-$C_4$-alkyl or $C_1$-$C_4$-haloalkyl groups present, if appropriate, as substituents on the methylene group and/or on the oxymethylene group may, by way of example, be a methyl group, an ethyl group, a propyl group, e.g. an n-propyl group or an isopropyl group, or a butyl group, e.g. an n-butyl group, isobutyl group, or tert-butyl group, or a halogen-substituted methyl group, ethyl group, propyl group, e.g. an n-propyl group or an isopropyl group, or butyl group, e.g. an n-butyl group, isobutyl group, or tert-butyl group, where, if two or more halogen substituents are present, these may be identical or different from one another, and where the halogen may, by way of example, be F, Cl, Br, or In here can be from 0 to 3, e.g. 0, 1, 2, or 3.

These groups may advantageously be introduced into the copolymers via ring-opening of cyclic ethers and of cyclic formals. Preferred cyclic ethers are those of the formula

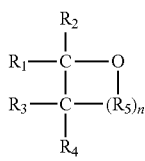

where the radicals $R_1$ to $R_5$ and the index n are as defined above.

Examples of inventive cyclic ethers and cyclic formals are ethylene oxide, propylene 1,2-oxide, butylene 1,2-oxide, butylene 1,3-oxide, 1,3-dioxane, 1,3-dioxolane, and 1,3-dioxepan, and also linear oligo- or polyformals as comonomers, e.g. polydioxolane or polydioxepan. Preferred comonomers are $C_2$-$C_4$ comonomers.

Oxymethylene terpolymers are another suitable component (A1), and may be prepared, by way of example, via reaction of trioxane, and of one of the cyclic ethers or cyclic formals described above, with a third monomer, preferably a bifunctional compound of the formula

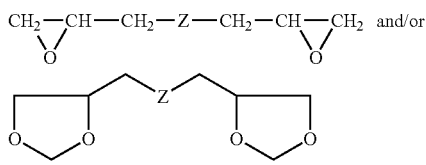

where Z is a chemical bond, —O—, or —OR—. In this context, R is an alkylene group preferably having from 1 to 8 carbon atoms and, if appropriate, having suitable substitution, for example a methylene, ethylene, propylene, butylene, pentylexne, hexylene, heptylene, or octylene group, or is a cycloalkylene group preferably having from 3 to 8 carbon atoms and, if appropriate, having suitable substitution, for example a cyclopropylene, cyclobutylene, cyclopentylene, cyclohexylene, cycloheptylene, or cyclooctylene group.

Examples of preferred monomers of this type are ethylene diglycide, diglycidyl ether, and diethers composed of glycidyl moieties and formaldehyde, dioxane, or trioxane in a molar ratio of 2:1, and also diethers composed of 2 mol of glycidyl compound and 1 mol of an aliphatic diol having 2, 3, 4, 5, 6, 7, or 8 carbon atoms, e.g. diglycidyl ethers of ethylene glycol, 1,4-butanediol, 1,3-butanediol, cyclobutane-1,3-diol, 1,2-propanediol, and 1,4-cyclohexanediol.

The invention particularly prefers end-group-stabilized polyoxymethylene polymers whose chain ends have a C—C bond.

The melting point of the component (A1) used according to the invention is preferably in the range from 150 to 200° C. If component (A1) is a polyoxymethylene homopolymer, the melting point is then more preferably in the range from 170 to 190° C. If component (A1) is a polyoxymethylene copolymer, the melting point is then more preferably in the range from 160 to 180° C. These melting points are temperatures determined by means of DSC to ISO 3146.

The molar mass (weight-average Mw; determined by way of the method described below in "Examples—Further test methods—Molar mass determination") of component (A1) is preferably in the range form 11500 to 240000 g/mol±10%, while the number-average molecular weight Mn is preferably in the range from 18000 to 85000. A further preference is that the molar mass (Mw) of component (A1) in the form of a polyoxymethylene homopolymer is in the range from 11500 to 240000 g/mol±10%, while its molecular weight Mn is in the range from 35000 to 85000. A further preference is that the molar mass (Mw) of component (A1) in the form of a polyoxymethylene copolymer is in the range from 80000 to 220000 g/mol±10%, while its molecular weight Mn is in the range from 18000 to 38000. The Mw:Mn ratio of component (A1) is preferably in the range from 0.14 to 12.2 g/mol. A further preference is that the Mw:Mn ratio of component (A1) in the form of a polyoxymethylene homopolymer is in the range from 0.14 to 6.9 g/mol A further preference is that the Mw:Mn ratio of component (A1) in the form of a polyoxymethylene copolymer is in the range from 2.1 to 12.2 g/mol.

The density of polymers suitable as component (A1) is usually from 1.37 to 1.45 g/cm³, determined to ISO 1183.

The present invention therefore also describes a molding composition described above, where the melting point of component (A1) is in the range from 150 to 200° C., determined by way of DSC to ISO 3146.

In particular, the present invention therefore comprises a molding composition, comprising from 10 to 99.999% by weight of at least one polyoxymethylene as component (A1), where the melting point of component (A1) is in the range from 150 to 200° C., determined by way of DSC to IS 3146, and from 0.001 to 10% by weight, based on the weight of component (A1) present in the molding composition, of at least one zeolitic material whose pore diameter is in the range from 0.3 to 0.5 nm, determined to DIN 66134 and DIN 66135, where the size of the particles of the zeolitic material is in the range from 3 to 7 µm, determined to ISO 13320.

A further preference is that the present invention comprises a molding composition, comprising from 10 to 99.95% by weight of at least one polyoxymethylene as component (A1), where the melting point of component (A1) is in the range from 150 to 200° C., determined by way of DSC to ISO 3146, and from 0.05 to 0.5% by weight, based on the weight of component (A1) present in the molding composition, of at least one zeolitic material whose pore diameter is in the range from 0.37 to 0.43 nm, determined to DIN 66134 and DIN 66135, where the size of the particles of the zeolitic material is in the range from 4 to 6 µm, determined to ISO 13320.

A further preference is that the present invention therefore comprises a molding composition, comprising from 10 to 99.999% by weight of at least one polyoxymethylene as component (A1), where the melting point of component (A1) is in the range from 150 to 200° C., determined by way of DSC to ISO 3146, and from 0.05 to 0.5% by weight, based on the weight of component (A1) present in the molding composition, of at least one zeolitic material whose pore diameter is in the range from 0.37 to 0.43 nm, determined to DIN 66134 and DIN 66135, where the size of the particles of the zeolitic material is in the range from 4 to 6 µm, determined to ISO 133207 and where the size of at least 90% of the primary crystals of the zeolitic material is in the range from 15 to 3.0 µm, determined by way of SEM, and the molar Si:Al ratio, calculated as molar $SiO_2$:$Al_2O_3$ ratio, is in the range from 0.9:1 to 5:1, and where the molding composition comprises no other zeolitic material.

A further preference is that the inventive molding composition comprises from 15 to 99.999% by weight, more preferably from 20 to 99.99% by weight, more preferably from 25 to 99.9% by weight, more preferably from 30 to 99% by weight, more preferably from 35 to 98.5% by weight, and particularly preferably from 40 to 98% by weight, of component (A1), based in each case on the total weight of the molding composition.

A further preference is that the inventive molding composition comprises from 15 to 99.999% by weight, more preferably from 20 to 99.99% by weight, more preferably from 25 to 99.9% by weight, more preferably from 30 to 99.7% by weight, more preferably from 35 to 99.6% by weight, and particularly preferably from 40 to 99.5% by weight, of component (A1), based in each case on the total weight of the molding composition.

An example of a particular feature of the inventive polyoxymethylene molding compositions is very low formaldehyde emission.

The formaldehyde emission of the molding compositions is preferably at most 8 ppm, more preferably at most 7 ppm, more preferably at most 6 ppm, and particularly preferably at most 5 ppm determined in each case by way of the specification VDA 275. By way of example, the inventive molding compositions have formaldehyde emission values of 2, 3, 4, or 5 ppm. The molding compositions can also have formaldehyde emission values of 6, 7, or 8 ppm.

The present invention therefore also provides a molding composition described above whose formaldehyde emission is at most 8 ppm, preferably at most 7 ppm, determined by way of VDA 275.

The standard VDA 275, referred to for the purposes of the present invention, is the July 1994 version of the standard. To prepare the specimens, an injection molding machine (Krauss Maffei KM 250 (56)) is used to produce plaques from polymer pellets. The injection molding parameters are selected as follows: screw diameter 50 mm, nozzle type: needle valve nozzle, nozzle diameter 4 mm, multiplate mold with 2 cavities, each measuring 110*110*2 mm as depicted in FIG. 8 below, mold typo P10/2.0 mm, mass temperature 200° C., mold surface temperature 90° C., screw rotation rate 100 rpm, screw advance speed 50 mm/s, hold pressure 50 bar, cycle time 50 s, of which hold-pressure time 25 s and cooling time 16 s. The cycle time is composed of the feed time (1 s), the hold-pressure time (25 s), the cooling time (16 s), and the plasticizing time (5 s). After injection molding, the injection-molded plaques are used to make plaques of dimensions 40×100 mm², all edges of which have a fresh saw cut. A hole of diameter 2.5-3 mm is also drilled centrally in the region of the upper margin. The plaques thus manufactured are aged under controlled conditions for 24 h at 23° C. and 50% relative humidity before the emission test is carried out. In the emission rest, the test plaques are fixed within a sealable 1 l polyethylene bottle, and 50 ml of deionized water are added. The specimen is then kept at 60° C. for 3 hours in the sealed bottle. The bottle is then cooled over 60 min at room temperature, and formaldehyde content in the distilled water is determined photometrically by the acetylacetonate method. Formaldehyde emission is then expressed in ppm in the form of formaldehyde content (in the deionized water) per kg of the dried specimen (mg (formaldehyde)/kg specimen=ppm).

Surprisingly, for the purposes of the present invention it was found that this very low forxaldehyde emission of the polyoxymethylene molding compositions can be achieved via addition of the zeolitic material described above to component (A1), whereas the prior art in the polyoxymethylene sector, as described above, discloses zeolites of another type merely and quite specifically as heat stabilizers. For the purposes of this prior art, if low formaldehyde emission values are to be achieved, the substances added always comprise those which react chemically with formaldehyde and thus remove it from the molding composition. As previously described above, the use of those formaldehyde scavengers can, however, lead to uncertainty and disadvantages with respect to the properties of the molding compositions, e.g. mechanical and/or thermal stability, or discoloration on weathering, or fogging.

A feature, inter alia, of the molding compositions according to the present invention is therefore that the addition of the zeolitic material described above leads to very low formaldehyde emission without conventional formaldehyde scavengers according to the prior art.

Prior-art compounds which may be mentioned and which react chemically with formaldehyde and thus remove it from polyoxymethylene molding compositions are generally compounds having at least one primary and/or secondary amino group, in particular organic compounds having at least one primary and/or secondary amino group, and especially organic compounds having monodisperse molar mass distribution and having at least one primary and/or secondary amino group.

Specific examples of these compounds from the prior art are:

(aa) amine-substituted triazine compounds, such as amine-substituted triazine compounds which comprise at least one aromatic group, e.g. compounds of the following structure

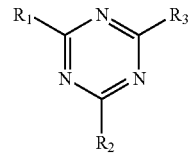

where the radicals $R_1$, $R_2$, and $R_3$ of this structure are identical or different, each being hydrogen, halogen atoms, a hydroxy group, an alkyl group, an alkoxy group, an aryl group, an arylalkyloxy group, or a substituted or unsubstituted amine group, with the proviso that at least one of the radicals $R_1$, $R_2$, and $R_3$ is a substituted or unsubstituted amine group, and at least one radical $R_2$, $R_1$, and $R_3$ is composed of an aromatic $C_5$-$C_{20}$ group, which may, if appropriate, have substitution. The halogen atom here is, by way of example, chlorine or bromine, preferably chlorine. Examples of the alkyl group are those having from 1 to 6 carbon atoms, preferably 1 to 4 carbon atoms. Examples of alkoxy groups axe those having from 1 to 6 carbon atoms, preferably from 1 to 4 carbon atoms. The phenyl group, naphthyl group, and fluorenyl group are preferred as aryl group, and phenylalkyloxy groups, in particular benzyloxy or phenylethyloxy groups, are preferred as arylalkyloxy groups, Examples of substituents on the substituted amino group comprise lower alkyl groups having from 1 to 6 carbon atoms, e.g. methyl, ethyl, butyl, or hexyl groups, phenyl groups, lower alkenyl groups having from 3 to 6 carbon atoms, e.g. allyl groups or hexenyl groups, hydroxyalkyl groups having 1 or 2 carbon atoms, e.g. hydroxymethyl groups or hydroxyethyl groups, and cyanoalkyl groups having from 3 to 6 carbon atoms, e.g. cyanoethyl groups or cyanobutyl groups. Examples of amine-substituted and aromatic substituted triazines comprise 2,4-diamino-6-(o,m,p)chlorophenyltriazine, 2-amino-4-chloro-6-phenyltriazine, 2-amino-4,6-diphenyltrine, 2,4-diamino-6-naphthyltriazine, 2,4-diamino-6-fluorenyltriazine, 2,4-diamino-6-(o,m,p)alkylphenyltriazines, where the methyl radical is preferred as substituent, 2,4-diamino-6-(o,m,p)methoxyphenyltriazine and 2,4-diamino-6-(o,m,p)carboxyphenyltriazines,
N-phenymelamine, N,N'-diphenylmelamine, particular preference being given to benzoguanamine, i.e. 2,4-diamino-6-phenyl-sym-triazine, 2,4-diamino-6-benzyloxy-sym-triazine. According to the prior art, particularly preferred compounds of this type are those which comprise at least two radicals $R_1$, $R_2$ or $R_3$ which are composed of (un)substituted amino groups, and/or in which the aromatic radical $R_1$, $R_2$, or $R_3$ is composed of at least one phenyl ring. Benzoguanamine is very particularly preferred.

(bb) Specific nitrogen-containing polymeric compounds: polyethyleneimines, polyvinylamines, polyallylamines, polyaminomethylstyrene, polyaminoethylstyrene, amine resins formed by way of reaction with formaldehyde (e.g. guanamine resin, melamine resin, guanidine resin, benzoguanamine-melamine resin, aromatic polyamine-melamine resins, urea-melamine resin, urea-benzoguanamine resin), hydrazide-containing compounds, polyaminothio ethers, polyureas, poly-5-methylenehydantoin, polypyrroles.

(cc) Spiro compounds which comprise at least one, for example from 1 to 4, triazine rings, preferably from 1 to 2 triazine rings and in particular 2 triazine rings. Particular preference is given here to compounds in which two triazine rings have been linked to one another by way of a spiro compound. The trine ring comprises 1,2,3-triazines, 1,2,4-triazines, and 1,3,5-triazines, preference being given to 1,3,5-triazines. The triazine ring may also comprise substituents, such as an alkyl group, e.g. a $C_1$-$C_4$-alkyl group, an aryl group, an amino group, or a substituted amino group. As triazine ring, preference is given to a triazine ring having an amino group or having a substituted amino group, and is in particular given to the guanamine ring. The spiro moiety can be composed exclusively of carbon atoms. Preference is given to spiro moieties which comprise one or more heteroatoms, e.g. in particular oxygen. Examples of these compounds are

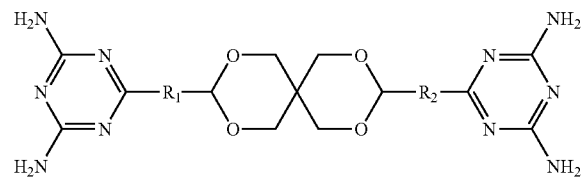

In the formula above, the alkylene groups $R_1$ and $R_2$ comprise an unbranched or branched $C_1$-$C_{10}$-alkylene group, such as methylene, ethylene, propylene, isopropylene, butylene, and isobutylene. Arylene groups $R_1$ and $R_2$ comprise $C_6$-$C_{10}$-arylene groups, such as phenylene or naphthylene. Aralkylene groups $R_1$ and $R_2$ comprise groups in which an alkylene group has been bonded to an arylene group. Preferred groups $R_1$ and $R_2$ are alkylene groups (e.g. $C_1$-$C_6$-alkylene groups), in particular $C_1$-$C_3$-alkylene groups, such as ethylene and others. The groups $R_1$ and $R_2$ may moreover have other substituents, such as $C_1$-$C_6$-alkyl groups, e.g. methyl, a phenyl group, amino group, or an N-substituted amino group. Specific examples of these spiro compounds are 3,9-bis[(3,5-diamino-2,4,6-triazaphenyl)-$C_1$-$C_6$-alkyl]-2,4,8,10-tetraoxaspiro[5.5]undecane, e.g. 3,9-bis[2-(3,5-diamino-2,4,6-triazaphenyl) ethyl]-2,4,8,10-tetraoxaspiro[5.5]undecane (CTU guanamine), 3,9-bis[1-(3,5-diamino-2,4,6-triazaphenyl) methyl]-2,4,8,10-tetraoxaspiro[5.5]undecane (CMTU guanamine), 3,9-bis[2-(3,5-diamino-2,4,6-triazaphenyl)-2-methylethyl]-2,4,8,10-tetraoxaspiro[5.5]undecane, 3,9-bis[1-(3,5-diamino-2,4,6-triazaphenyl)-1,1-dimethylmethyl]-2,4,8,10-tetraoxaspiro[5.5]undecane, 3,9-bis[3-(3,5-diamino-2,4,6-triazaphenyl)-1,1-dimethylpropyl]-2,4,8,10-tetraoxaspiro[5.5]undecane, and 3,9-bis[3-(3,5-diamino-2,4,6-triazaphenyl)-2,2-dimethylpropyl]-2,4,8,10-tetraoxaspiro[5.5]undecane. Among the spiro compounds, preference is given to 3,9-bis[(3,5-diamino-2,4,6-triazaphenyl)-straight- or branched-chain-$C_1$-$C_5$-alkyl]-2,4,8,10-tetraoxaspiro[5.5]undecane, e.g. CTU guanamine, CMTU guanamine, 3,9-bis[3-(3,5-diamino-2,4,6-triazaphenyl)-1,1-dimethylpropyl]-2,4,8,10-tetraoxaspiro[5.5]undecane. CTU guanamine is particularly preferred.

(dd) Amino acids, such as α-, β-, γ- or δ-amino acids. Examples of α-amino acids are monoaminomonocarboxylic acids, such as glycine, alanine, valine, norvaline, leucine, norleucine, isoleucine, phenylalanine, tyrosine, diiodotyrosine, surinamine, threonine, serine, proline, hydroxyproline, tryptophan, methionine, cystine, cysteine, citrulline α-aminobutanoic acid, hexahydropicolinic acid, teanine, monoaminodicarboxylic acids, such as aspartic acid, glutamic acid, asparagine, glutamine, hexahydrodipicolinic acid, hexahydroquinolinic acid, diaminomocarboxylic acids, such as lysine, hydroxylysine, arginine, histidine. Examples of β-, γ- or δ-amino acids are β-alanine, β-aminobutanoic acid, hexahydroquinomeronic acid, γ-aminobutanoic acid, δ-amino-n-valeric acid. The amino acids may be present in D-, L-, or DL-form. The amino acids also comprise derivatives in which a carboxy group is present in the form of a metal salt, e.g. in the form of an alkali metal salt or alkaline earth metal salt, or in the form of amide, hydrazide, or ester, such as methyl ester or ethyl ester. The amino acids may also be present supported on a porous material, for example on silica gel, aluminum oxide, titanium oxide, zirconium oxide, sepiolite, smectite, palygorscite, imogolite, zeolite, or activated charcoal. The amino acids may also form an inclusion compound or a clathrate with a host, for example with α, β-, γ- or δ-cyclodextrin.

(ee) Compounds having one or two hydrazide groups, in particular having two hydrazide groups, e.g. polymeric dihydrazide compounds, such as polyacrylic hydrazide, or oxalic dihydrazide, malonic dihydrazide, adipic dihydrazide, succinic dihydrazide, glutaric dihydrazide, pimelic dihydrazide, suberic dihydrazide, azelaic dihydrazide, sebacic dihydrazide, terephthalic dihydrazide, isophthalic dihydrazide.

(ff) Poly-β-alanines, comprising the structural unit

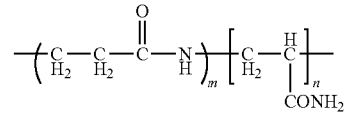

The present invention therefore also provides a molding composition, comprising from 10 to 99.999% by weight of at least one polyoxyethylene as component (A1) and from 0.001 to 10% by weight, based on the weight of component (A1) present in the molding composition, of at least one zeolitic material whose pore diameter is in the range from 0.3 to 0.5 nm, determined to DIN 66134 and DIN 66135, where the size of the particles of the zeolitic material is in the range from 3 to 7 μm, determined to ISO 13320, where the molding composition comprises none of the compounds of (aa) and none of the compounds of (bb) and none of the compounds of (cc) and none of the compounds of (dd) and none of the compounds of (ee) and none of the compounds of (ff), further preference being given to a formaldehyde emission of at most 8 ppm, preferably at most 7 ppm for this molding composition, more preferably at most 6 ppm, and particularly preferably at most 5 ppm, for example 2, 3, 4, or 5 ppm, or for example 6, 7, or 8 ppm, in each case determined to VDA 275. Reference may be made to the statements above with respect to further preferred specifications for the zeolitic material, e.g. content of zeolitic material, based on the weight of the polyoxymethylene, and/or size of the primary crystals, and/or of the molar Si:Al ratio, and/or of the content of zeolitic material in the H form, and the various combinations of these parameters.

One particularly preferred embodiment of the present invention also provides a molding composition, comprising from 10 to 99.999% by weight of at least one polyoxymethylene as component (A1) and from 0.001 to 10% by weight, based on the weight of component (A1) present in the molding composition, of at least one zeolitic material whose pore diameter is in the range from 0.3 to 0.5 nm, determined to DIN 66134 and DIN 66135, where the size of the particles of the zeolitic material is in the range from 3 to 7 μm, determined to ISO 13320, where the molding composition comprises none of the compounds of (cc), further preference being given to a formaldehyde emission of at most 8 ppm more preferably at most 7 ppm for this molding composition, more preferably at most 6 ppm, and particularly preferably at most 5 ppm, for example 2, 3, 4, or 5 ppm, or for example 6, 7, or 8 ppm, in each case determined to VDA 275. Reference may be made to the statements above with respect to further preferred specifications for the zeolitic material, e.g. content of zeolitic material, based on the weight of the polyoxymethylene, and/or size of the primary crystals, and/or of the molar Si:Al ratio, and/or of the content of zeolitic material in the H form, and the various combinations of these parameters.

The present invention therefore also provides a molding composition described above, where the molding composition comprises no spiro compound comprising at least one triazine ring.

The present invention therefore also provides a molding composition described above, where the molding composition comprises no organic compound having monodisperse molar mass distribution comprising at least one primary amino group and/or at least one secondary amino group, preferably at least one primary amino group.

The present invention also provides a molding composition described above, where the molding composition comprises, other than at least one polyamide, no organic compound having polydisperse molar mass distribution comprising at least one amino group.

As discussed in detail above, for the purposes of the present invention it has surprisingly been found that the zeolites described and used as stabilizers in the prior art can be used as formaldehyde scavengers. Addition of other formaldehyde scavengers can therefore be omitted in the inventive molding compositions.

Another aspect of the present invention therefore provides the use of a zeolitic material as a constituent of a molding composition comprising at least one polyoxymethylene for reduction of the formaldehyde emission of the molding composition. The present invention therefore also provides a process for reduction of the formaldehyde emission of a molding composition comprising at least one polyoxymethylene via use of at least one zeolitic material as a constituent of the molding composition.

In principle, this use comprises any content of polyoxymethylene and of zeolitic material in the molding composition. There are also in principle no restrictions relating to this inventive use concerning the nature and the specifications of the zeolitic material, as long as at least some of the zeolitic material is capable of adsorptive binding of formaldehyde.

Examples of suitable zeolitic materials for the inventive use are zeolites of the following constitutions a) and b):

   a)

where
Q=$Na^+$, $K^+$, $Li^+$, $Cs^+$, $NH_4^+$, or a mixture composed of two or more of these ions;
M=$Fe^{3+}$, $B^{3+}$, $Ga^{3+}$, $Ti^{4+}$, $Zn^{2+}$, or $Ge^{4+}$, or a mixture composed of two or more of these ions;
X=0-1.0, and
Y=0-0.05 or

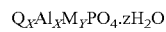   b)

where
Q=$Na^+$, $K^+$, $Li^+$, $Cs^+$, or $NH_4^+$, or a mixture composed of two or more of these ions;
M=$Fe^{3+}$, $B^{3+}$, $Li^+$, $Be^{2+}$, $Mg^{2+}$, $Ti^{4+}$, $V^{4+}$, $Zn^{2+}$, $Co^{2+}$, or $Si^{4+}$, or a mixture composed of two or more of these ions;
X=0.9-1.0, and
Y=0-0.10.

In the two structures of a) and b), z is the number of molecules of water of crystallization, where z can be 0, and where X and Y cannot simultaneously be 0. The selection here of X and Y is such as to obtain equalized electrovalency.

For the purposes of the inventive use, examples of zeolitic materials are zeolites of type A, type X, type Y, type T, sodalites, mordenites, analzites, clinopilolites, chabazites, and/or erionites, where these are suitable for adsorption of formaldehyde. Examples of structural types are zeolites allocated by X-ray diffraction to the following types. ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK BOG, BPH, BRE, CAN, CAS, CDO, CFI, CGF, CGS, CHA, CHI, CLO, CON, CZP, DAC, DDR, DFO, DFT, DOH, DON, EAB, EDI, EMT, EPI, ERI, ESV, ETR, EUO, FAU, FER, FRA, GIS, GIU, GME, GON, GOO, HEU, IFR, ISV, ITE, ITH, ITW, IWR, IWW, JBW, KFI, LAU, LEV, LIO, LOS, LOV, LTA, LTL, LTN, MAR, MAZ, MEI, MEL, MEP, MER, MFI, MFS, MON, MOR, MSO, MTF, MTN, MTT, MTW, MWW, NAB, NAT, NES, NON, NPO, OBW, OFF, OSI, OSO, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SSY, STF, STI, STT, TER, THO, TON, TSC, UEI, UFI, UOZ, USI, UTL, VET, VFI, VNI, VSV, WEI, WEN, YNU, YUG, or ZON, as described above.

Among these structures, structures allocated by X-ray diffraction to the type BEA, FER, FAU, ETA, MEL, MFI, or MOR are particularly preferred for the inventive use. Mention may also be made of mixed structures composed of two or more of these types, an example being a zeolitic material having mixed MEL/MFI structure. Particular preference is given, inter alia, to a zeolitic material of LTA type.

Zeolitic materials preferred for the inventive use are those whose pore diameter is in the range from 0.3 to 0.5 nm, preferably in the range from 0.31 to 0.49 nm, more preferably in the range from 0.32 to 0.48 nm, more preferably in the range from 0.33 to 0.47 nm more preferably in the range from 0.34 to 0.46 nm, and particularly preferably in the range from 0.35 to 0.45 nm. Examples of particularly preferred pore diameters are 0.36 nm, or 0.37 nm, or 0.38 nm, or 0.39 nm, or 0.40 nm, or 0.41 nm, or 0.42 nm, or 0.43 nm, or 0.44 nm, in each case determined to DIN 66134 and DIN 66135.

In the present invention and also in the use described above, the pore diameter of the zeolitic material is therefore in the range from 0.3 to 0.5 nm, determined to DIN 66134 and DIN 66135. The present invention therefore also provides a process described above for reduction of the formaldehyde emission of a molding composition comprising at least one polyoxymethylene via use of at least one zeolitic material as a constituent of the molding composition, where the pore diameter of the zeolitic material is in the range from 0.3 to 0.5 nm, determined to DIN 66134 and DIN 66135.

Other zeolitic materials preferred for the inventive use are those whose particle size, determined by way of ISO 13320, is in the range from 3.0 to 7.0 μm, more preferably in the range form 3.1 to 6.9 μm, more preferably in the range from 3.2 to 6.8 μm, more preferably in the range from 3.3 to 6.7 μm, more preferably in the range from 3.4 to 6.6 μm, more preferably in the range from 3.5 to 6.5 μm, more preferably in the range from 3.6 to 6.4 μm, more preferably in the range from 3.7 to 6.3 μm, more preferably in the range from 3.8 to 6.2 μm, more preferably in the range from 3.9 to 6.1 μm, and particularly preferably in the range from 4.0 to 6.0 μm.

In the present invention, and also in the use described above, the size of the particles of the zeolitic material is therefore in the range from 3 to 7 μm, determined to ISO 13320. The present invention therefore also provides a process as described above for reduction of the formaldehyde emission of a molding composition comprising at least one polyoxymethylene via use of at least one zeolitic material as a constituent of the molding composition, where the particle size of the zeolitic material is in the range from 3 to 7 μm, determined by way of ISO 13320.

For the purposes of the inventive use, the formaldehyde emission value of molding compositions comprising polyoxymethylene is preferably at most 8 ppm, more preferably at most 7 ppm, more preferably at most 6 ppm, more preferably at most 5 ppm, for example 2 ppm, 3 ppm, 4 ppm, or 5 ppm, or for example 6, 7, or 8 ppm, determined in each case by way of VDA 275.

In the present invention, and also in the use described above, the formaldehyde omission of the molding composition is therefore reduced to a value of at most 8 ppm, preferably of at most 7 ppm, determined by way of VDA 275. The present invention therefore also provides a process described above for reduction of the formaldehyde emission of a molding composition comprising at least one polyoxymethylene via use of at least one zeolitic material as a constituent of the molding composition, where the formaldehyde emission of the molding composition is reduced to a value of at most 8 ppm, preferably at most 7 ppm, determined by way of VDA 275

Particular preference is given to the inventive use with respect to molding compositions comprising polyoxymethylene which comprise no compound of (aa) and no compound of (bb) and no compound of (cc) and no compound of (dd) and no compound of (ee) and no compound of (ff), in particular no compound of (cc), more preferably no spiro compound comprising at least one triazine ring, and/or no organic compound having monodisperse molar mass distribution comprising at least one primary amino group and/or at least one secondary amino group, preferably at least one primary amino group, and/or which comprise, other than at least one polyamide, no organic compound having polydisperse molar mass distribution comprising at least one amino group.

Further preference is given here to the inventive use with respect to molding compositions comprising polyoxymethylene, where the amount of the zeolitic material present in the molding compositions is in the range from 0.002 to 9% by weight, more preferably in the range from 0.003 to 8% by weight, more preferably in the range from 0.004 to 7% by weight, more preferably in the range from 0.005 to 6% by weight, more preferably in the range from 0.006 to 5% by weight, more preferably in the range from 0.007 to 4% by weight, more preferably in the range from 0.008 to 3% by weight, more preferably in the range from 0.009 to 2% by weight, more preferably in the range from 0.01 to 1% by weight, more preferably in the range from 0.02 to 0.9% by weight, more preferably in the range from 0.03 to 0.8% by weight, more preferably in the range from 0.04 to 0.7% by weight, more preferably in the range from 0.05 to 0.6% by weight, and particularly preferably in the range from 0.05 to 0.50% by weight, based in each case on the total amount of polyoxymethylene present in the molding compositions. The amount of the polyoxymethylene present as component (A1) in the molding compositions here is preferably from 10 to 99.999% by weight, more preferably from 15 to 99.999% by weight, more preferably from 20 to 99.99% by weight, more preferably from 25 to 99.9% by weight, more preferably from 30 to 99% by weight, more preferably from 35 to 98.5% by weight, and particularly preferably from 40 to 98% by weight, of component (A1), based in each case on the total weight of the molding composition. The molding composition can also comprise polyoxymethylene as component (A1) from 15 to 99.999% by weight, more preferably from 20 to 99.99% by weight, more preferably from 25 to 99.9% by weight, more preferably from 30 to 99.7% by weight, more preferably from 35 to 99.6% by weight, and particularly preferably from 40 to 99.5% by weight, based in each case on the total weight of the molding composition.

The molding compositions of the present invention may comprise, in addition to the zeolitic material described above and to the at least one polyoxymethylene, up to 89.99% by weight, preferably from 0.5 to 89.99% by weight, more preferably from 1 to 89.99% by weight, more preferably from 1 to 80% by weight, more preferably from 1 to 70% by weight, more preferably from 1 to 60% by weight, more preferably from 1 to 50% by weight, and particularly preferably from 1 to 40% by weight, based on the weight of the molding composition, of other components.

Examples of these additives may be stabilizers, filers, dyes, and other substances conventionally used in polyoxymethylene molding compositions.

According to one preferred embodiment of the present invention, the molding compositions also comprise at least one stabilizer as component (D1). For the purposes of the present invention, stabilizers are compounds which can inhibit, or reduce the level of, oxidation or photooxidation of the at least one polyoxymethylene, and/or of at least one other component susceptible to oxidation or photooxidation.

For the purposes of the present invention, examples of stabilizers whose use is particularly preferred are sterically hindered phenols. Suitable sterically hindered phenols here are in principle any of the compounds having a phenolic structure and having at least one bulky group on the phenolic ring.

In the context of this class of compound, mention ray be made of monocyclic and polycyclic hindered phenols, inter aria. In the case of the polycyclic hindered phenols here, the corresponding rings have bonding by way of, for example, a hydrocarbon group or by way of a hydrocarbon group comprising a sulfur atom.

Examples of compounds preferably used for the purposes of the present invention are those of the structure

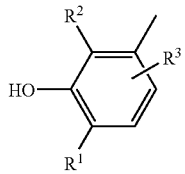

where $R^1$ and $R^2$ are identical or different from one another, where $R^1$ and $R^2$ are an alkyl group, a substituted alkyl group, or a substituted triazole group. $R^3$ here is an al group, a substituted alkyl group, an alkoxy group, or a substituted amino group. Stabilizers (antioxidants) of the type mentioned are described by way of example in DE 27 02 661 A1 or U.S. Pat. No. 4,360,617. An example which may be mentioned is 2,6-di-tert-butyl-cresol.

Another group of preferred sterically hindered phenols derives from substituted benzenecarboxylic acids, in particular substituted benzenepropionic acids.

Particularly preferred compounds of this class are compounds of the formula

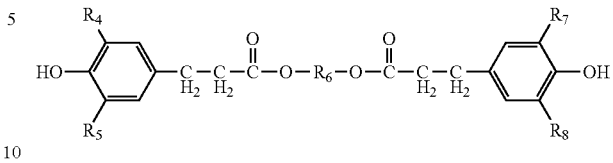

where $R_4$, $R_5$, $R_7$, and $R_8$, independently of one another, may be alkyl groups having 1, 2, 3, 4, 5, 6, 7, or 8 carbon atoms, which may, if appropriate, have suitable substitution. At least one of these groups $R_4$, $R_5$, $R_7$, and $R_8$ is a bulky group, e.g. preferably an isopropyl group, a tert-butyl group, a phenyl group, or an unreactive group of comparable size. $R_6$ is preferably a divalent aliphatic radical having 1, 2, 3, 4, 5, 6, 7, 8, 9, or 10 carbon atoms, and may also have C—O bonds in the main chain.

For the purposes of the present invention, compounds particularly preferred as component (D1) have the following structure:

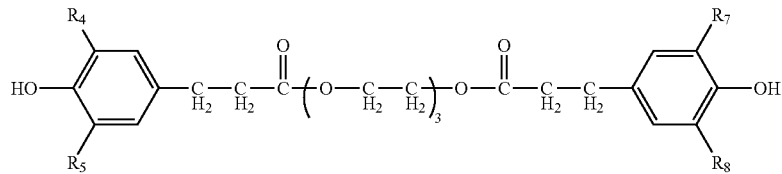

where $R_4=R_7=$tert-butyl and $R_5=R_8=$methyl, and/or

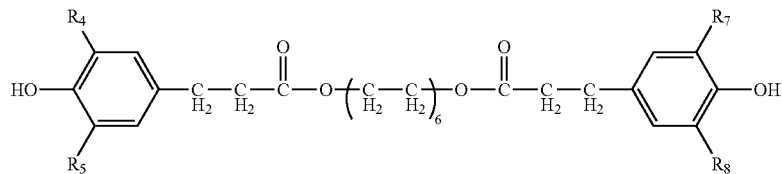

where $R_4=R_5=R_7=R_8=$tert-butyl.

Other examples of sterically hindered phenols are:
2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxyphenyl)propionate], distearyl 3,5-di-tert-butyl-4-hydroxybenzylphosphonate, 2,6,7-trioxa-1-phosphabicyclo[2.2.2.]oct-4-ylmethyl 3,5-di-tert-butyl-4-hydroxyhydrocinnamate, 3,5-di-tert-butyl-4-hydroxyphenyl 3,5-di-tert-butyl-4-hydroxyhydrocinnamate, 3,5-di-tert-butylbutylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldimethylamine, and N,N'-hexamethylenebis-3,5-di-tert-butyl-4-hydroxyhydrocinnamide.

For the purposes of the present invention, particular preference is given to 2,2'-methylenebis(4-methyl-tert-butylphenol), 1,6-hexanediol bis[3-(3,5-di-tert-butyl-4-hydroxyphenyl)propionate, pentaerythrityl tetrakis[3-(3,5-di-tert-butyl-4-hydroxyphenyl)propionate], and triethylene glycol bis[3-(3-tert-butyl-5-methyl-4-hydroxy)phenyl]propionate.

According to the invention, it is likewise preferable to use sterically hindered phenols having not more than one sterically hindered group in the ortho-position with respect to the phenolic hydroxy group. In particular, these hindered phenols prove to be advantageous components (D1) when the colorfastness of the inventive molding compositions is assessed, especially on aging for prolonged periods in diffuse light.

The amount preferably used of the stabilizers, which are used individually or in the form of mixtures composed of two or more mutually differing compounds, is preferably from 0.005 to 2% by weight, more preferably from 0.01 to 1.0% by weight, and particularly preferably from 0.05 to 0.6% by weight, based in each case on the weight of component (A1).

The invention therefore also provides a molding composition described above, where the molding composition also comprises from 0.005 to 2% by weight, based on the weight of component (A1), of a stabilizer, preferably of a sterically hindered phenol, more preferably of a sterically hindered phenol of the structure

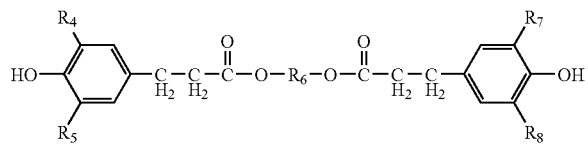

and in particular of a sterically hindered phenol selected from the group consisting of 2,2'-methylenebis(4-methyl-6-tert-butylphenyl), 1,6-hexanediol bis(3,5-di-tert-butyl-4-hydroxyphenyl)propionate, pentaerythrityl tetrakis[3-(3,5-di-tert-butyl-4-hydroxyphenyl)propionate], and triethylene glycol bis[3-(3-text-butyl-5-methyl-4-hydroxy)phenyl]propionate, and a mixture composed of two, three, or four of these compounds, as component (D1).

The ratio by weight of component (D1) to zeolitic material in the molding composition is preferably in the range from 20:1 to 1:10 more preferably from 10:1 to 1:5, and particularly preferably from 7:1 to 1:2.

The present invention therefore also provides a molding composition described above, where component (D1) is a sterically hindered phenol and the ratio by weigh of (D1) to zeolitic material is in the range from 7:1 to 1:2.

By way of example, particular preference is given here to a range of from 4:1 to 1:2.

According to another preferred embodiment of the present invention, the molding compositions also comprise at least one polyamide as component (D2), if appropriate in addition to component (D1).

Examples of polyamides suitable according to the invention are semicrystalline or amorphous resins, such as those described in Encyclopedia of Polymer Science and Engineering, Vol. 11, John Wiley & Sons, Inc., 1988, pp. 315-489. The melting point of the polyamides used according to the invention is preferably below 225° C., more preferably below 215° C.

Examples of suitable polyamides are polyhexamethyleneazelamide, polyhexamethylenesebacamide, polyhexamethylenedodecanediamide, poly-11-aminoundecanamide, and bis-(p-aminocyclohexyl)methanedodecanediamide, or the products obtained via ring-opening of lactams, for example, or polylaurolactam. Other suitable polyamides are those based on terephthalic or isophthalic acid as acid component and/or trimethylhexamethylenediamine or bis(p-aminocyclohexyl)propane as diamine components, and also polyamide parent resins prepared via copolymerization of two or more of the abovementioned polymers or their components.

Particularly suitable polyamides which may be mentioned are copolyamides based on caprolactam, hexamethylenediamine, p,p'-diaminodicylohcxylmethane, and adipic acid. Examples of these are the products marketed with the name Ultramid® 1 C, Ultramid® C 31, Ultramid® C 3101, and Ultramid® C 33, from BASF Aktiengesellschaft.

Other suitable polyamides are marketed with the name Elvamide® by DuPont.

The preparation of these polyamides is likewise described in the abovementioned publication. The ratio of terminal amino groups to terminal acid groups can be controlled via variation in the molar ratio of the starting compounds.

The amount preferably used of the polyamides, which may be used individually or in the form of mixtures composed of two or more mutually different compounds, is preferably from 0.001 to 2% by weight, more preferably from 0.005 to 1.2% by weight, and particularly preferably from 0.01 to 0.08% by weight, based in each case on the weight of component (A1).

The present invention therefore also provides a molding composition described above which also comprises from 0.001 to 2% by weight, based on the weight of component (A1), of at least one polyamide, if appropriate in addition to component (D1), as component (D2).

The ratio by weight of the zeolitic material to component (D2) in the molding composition is preferably in the range from 1:1 to 1:25, more preferably in the range from 1:1 to 1:15, and in particular in the range from 1:1 to 1:5.

In some instances, the dispersibility of the polyamides used can be improved via concomitant use of a polycondensate composed of 2,2-di(4-hydroxyphenyl)propane (bisphenol A) and epichlorohydrin.

These condensates composed of epichlorohydrin and bisphenol A are commercially available. Trade names of the polycondensates are Phenoxy® (Union Carbide Corporation) or Epikote® (Shell). The molecular weight of the polycondensates may vary within wide limits; in principle, any of the types available commercially is suitable.

According to another preferred embodiment of the present invention, the molding compositions also comprise at least one alkaline earth metal silicate and/or one alkaline earth metal glycerophosphate as component (D3), if appropriate in addition to component (D1) and/or component (D2).

The inventive molding compositions preferably comprise an amount in the range from 0.002 to 2.0% by weight, more preferably from 0.005 to 0.5% by weight, and particularly preferably from 0.01 to 0.3% by weight, of the at least one alkaline earth metal silicate and/or one alkaline ear metal glycerophosphate, based in each case on the weight of component (A1).

For the purposes of the present invention, particular preference is given to use of calcium silicas, calcium glycerophosphates, magnesium silicates, and magnesium glycerophosphates. Magnesium silicates and magnesium glycerophosphates are particularly preferred.

Preference is generally given to alkaline earth metal silicates of the following structure:

$MeO.xSiO_2.nH_2O$ where

Me is an alkaline earth metal, preferably calcium and magnesium, and in particular magnesium, x is a number from 1.4 to 10, preferably from 1.4 to 6, and n is a number greater than or equal to 0, preferably 0, 1, 2, 3, 4, 5, 6, 7, or 8

The particularly preferred silicates and glycerophosphates may be characterized as follows:

Calcium silicate and magnesium silicate, respectively:

content of CaO and MgO, respectively; from 4 to 32% by weight, preferably from 8 to 30% by weight and in particular from 12 to 25% by weight, ratio of $SiO_2$ to CaO and $SiO_2$ to MgO, respectively (mol/mol): from 1.4 to 10, preferably from 1.4 to 6 and in particular from 1.4 to 4, bulk density: from 10 to 80 g/100 ml, preferably from 10 to 40 g/100 ml, and average particle size; less than 100 μm, preferably less than 50 μm.

Calcium glycerophosphates and magnesium glycerophosphates, respectively:

content of CaO and MgO, respectively: above 70% by weight, preferably above 80% by weight, residue on ignition: from 45 to 65% by weight, melting point: above 300° C. and average particle size; less than 100 μm, preferably less than 50 μm.

The present invention therefore also provides a molding composition described above comprising from 0.002 to 2% by weight, based on the weight of component (A1), of at least one alkaline earth metal silicate and/or one alkaline ear metal glycerophosphate as component (D3), if appropriate in addition to component (D1) and/or (D2).

This percent by weight stated is based on the total of the weights of all of the alkaline earth metal silicates and alkaline earth metal glycerophosphates used.

According to another preferred embodiment of the present invention, the molding compositions also comprise, as component (D4), if appropriate in addition to component (D1) and/or component (D2) and/or component (D3)

at least one ester obtainable via reaction of at least one saturated or unsaturated aliphatic carboxylic acid having from 10 to 40 carbon atoms with at least one polyol or with at least one saturated aliphatic alcohol having from 2 to 40 carbon atoms, and/or at least one amide obtainable via reaction of at least one, saturated or unsaturated aliphatic carboxylic acid having from 10 to 40 carbon atoms with an amine having from 2 to 20 carbon atoms; and/or at least one ether obtainable via reaction of at least one alcohol with at least one ethylene oxide.

It is preferable to use an ester obtainable via reaction of at least one saturated or unsaturated aliphatic carboxylic acid having from 12 to 30, more preferably from 14 to 24, and in particular from 16 to 22, carbon atoms with at least one polyol or with at least one saturated aliphatic alcohol having from 2 to 30, more preferably from 2 to 20, more preferably from 2 to 10, and in particular from 2 to 6, for example 2, 3, 4, 5, or 6, carbon atoms.

It is preferable to use an amide obtainable via reaction of at least one saturated or unsaturated aliphatic carboxylic acid having from 12 to 30, more preferably from 14 to 24, and in particular from 16 to 22, carbon atoms with an amine having from 2 to 10, and in particular from 2 to 6, for example 2, 3, 4, 5, or 6, carbon atoms.

The carboxylic acids used to prepare the esters and/or amides may be mono- or dibasic. Examples which may be mentioned are pelargonic acid, palmitic acid, lauric acid, margaric acid, dodecanedioic acid, behenic acid, and, particularly preferably, stearic acid, capric acid, and also montanic acid (a mixture of fatty acids having from 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol and pentaerythritol, and preference is given to glycerol and pentaerythritol.

The aliphatic amines may be mono- to tribasic. Examples of these are stearylamine, ethylenediamine, propylenediamine, hexamethylenediamine and di(6-aminohexyl)amine, and particular preference is given to ethylenediamine and hexamethylenediamine.

Correspondingly, preferred esters and amides are glycerol distearate, glycerol tristearate, ethyleneliamine distearate, glycerol monopalmitate, glycerol trilaurate, glycerol monobehenate and pentaerythritol tetrastearate.

It is also possible to use mixtures of different esters or amides or esters with amides combined, in any desired mixing ratio.

Other suitable compounds are polyether polyols and polyester polyols which have been esterified with mono- or polybasic carboxylic acids, preferably fatty acids, or have been etherified. Suitable products are available commercially, for example Loxiol® EP 728 from Henkel KGaA.

Preferred ethers derived from alcohols and ethylene oxide have the general formula

$$RO-(CH_2-CH_2-O)_n-H$$

where R is an alkyl group having from 6 to 40 carbon atoms and n is an integer greater than or equal to 1.

R is particularly preferably a saturated $C_{16}$-$C_{18}$ fatty alcohol where n is 50, this alcohol being obtainable commercially from BASF as Lutensol® AT 50.

The amount of component (D4) present in the inventive molding compositions is preferably from 0.01 to 5% by weight, more preferably from 0.09 to 2% by weight, and particularly preferably from 0.1 to 0.7% by weight, based on the weight of component (A1).

The % by weight stated here is based on the total weight of esters, amides, and ethers used as component (D4).

The present invention therefore also provides a molding composition described above also comprising, as component (D4), if appropriate in addition to component (D1) and/or (D2) and/or (D3), from 0.01 to 5% by weight, based on the weight of component (A1), of at least one ester obtainable via reaction of at least one saturated or unsaturated aliphatic carboxylic acid having from 10 to 40 carbon atoms with at least one polyol or with at least one saturated aliphatic alcohol having from 2 to 40 carbon atoms, and/or of at least one amide obtainable via reaction of at least one saturated or unsaturated aliphatic carboxylic acid having from 10 to 40 carbon atoms with an amine having from 2 to 20 carbon atoms; and/or of at least one ether obtainable via reaction of at least one alcohol with at least one ethylene oxide.

According to another preferred embodiment of the present invention, the molding compositions also comprise talc as component (C), if appropriate in addition to component (D1) and/or component (D2) and/or component (D3) and/or component (D4).

Talc is a hydrated magnesium silicate whose constitution is $Mg_3[(OH)_2/Si_4O_{10}]$ or $3MgO.4SiO_2.H_2O$. This three-layer phyllosilicate has triclinic, monoclinic or rhombic crystalline form, with lamellar habit. Mn, Ti, Cr, Ni, Na and/or K may also be present, preferably as trace elements. The OH group may also have been replaced to some extent by fluoride. It is particularly preferable to use talc whose particle size is 100%<20 μm. The particle size distribution is usually determined via sedimentation analysis (DIN 6616-1) and is preferably:

| | |
|---|---|
| <20 μm | 100% by weight |
| <10 μm | 99% by weight |
| <5 μm | 85% by weight |
| <3 μm | 60% by weight |
| <2 μm | 43% by weight |

Products of this type are commercially available in the form of Micro-Talc I.T. extra (Norwegian Talc Minerals).

The inventive molding compositions preferably comprise from 0.01 to 5% by weight, more preferably from 0.01 to 4% by weight, more preferably from 0.01 to 3% by weight, and particularly preferably from 0.02 to 2% by weight, based on the weight of component (A1), of talc.

The present invention therefore also provides a molding composition described above also comprising from 0.01 to 5% by weight, based on the weight of component (A1), of talc as component (C), if appropriate in addition to component (D1) and/or (D2) and/or (D3) and/or (D4).

According to another embodiment of the present invention, the inventive molding compositions comprise at least one other nucleating agent as further component (D5), alongside the zeolite. The inventive molding compositions preferably comprise from 0.0001 to 1% by weight, more preferably from 0.001 to 0.08% by weight, and particularly preferably from 0.01 to 0.3% by weight based on the weight of component (A1), of the further nucleating agent, Nucleating agents which may be used here are any of the compounds known for this purpose, examples being melamine cyanurate, boron compounds, such as boron nitride, silica, pigments, e.g. Heliogen Blue® (copper phthalocyanine pigment; registered trade mark of BASF Aktiengesellschaft).

The present invention therefore also describes a molding composition described above also comprising from 0.0001 to 1% by weight, based on the weight of component (A1), of at least one further nucleating agent as component (D5), alongside the zeolitic material, if appropriate in addition to component (D1) and/or (D2) and/or (D3) and/or (D4) and/or (C).

The term "nucleating agent" as used for the purposes of the present invention designates a nucleating compound which increases the crystallization rate of semicrystalline polymers, such as polyoxymethylene. In this connection, reference may be made to H. Zweifel (editor), "Plastics Additives Handbook", 5$^{th}$ edition, Hanser Verlag, Munich & Cincinnati, 2001, chapter 18 "Nucleating Agents for Semicrystalline Polymers", pp. 949 et seq., in particular pp. 956-969. Kunststoffhandbuch 3/1, "Polycarbonate, Polyacetale, Polyester, Celluloseester" [Polycarbonates, polyacetals, polyesters, cellulose esters], Hanser Verlag, Munich & Vienna, 1992, p. 323, also gives data specific to polyoxymethylene.

According to another embodiment of the present invention, the inventive molding compositions comprise at least one suitable filler as further component (D6). the inventive molding compositions preferably comprise up to 50% by weight, preferably from 5 to 40% by weight, based on the weight of component (A1), of a filler. Examples of suitable fillers which may be mentioned are potassium titanate whiskers, wollastonite, carbon fibers, and preferably glass fibers, and the form in which glass fibers may be used here is, by way of example, that of glass textiles, glass mats, glass nonwovens, and/or glass silk rovings, or that of cut glass silk composed of low-alkali E glass with diameter from 5 to 200 μm, preferably from 8 to 50 μm, the average length of the fibrous fillers after their incorporation preferably being from 0.05 to 1 mm, in particular from 0.1 to 0.5 μm.

Examples of other suitable fillers are calcium carbonate or glass beads, preferably in ground form, or a mixture of these fillers.

The present invention therefore also describes a molding composition described above also comprising up to 50% by weight, based on the weight of component (A1), of at least one filler as component (D6), if appropriate in addition to component (D1) and/or (D2) and/or (D3) and/or (H4) and/or (D5) and/or (C).

According to another embodiment of the present invention, the inventive molding compositions also comprise at least one thermoplastic polyurethane (TPU) as fiber component (A2) of the present invention, if appropriate in addition to component (D1), and/or (D2) and/or (D3) and/or (D4) and/or (D5) and/or (D6). This at least one thermoplastic polyurethane is more preferably used as impact-modifying polymer.

The inventive molding compositions preferably comprise an amount of up to 55% by weight, more preferably up to 50% by weight, and in particular up to 45% by weight, in each case based on the weight of component (A1), of component (A2). The inventive molding compositions preferably comprise an amount of at least 10% by weight, more preferably at least 12% by weight, based in each case on the weight of component (A1), of component (A2). The inventive molding compositions preferably comprise an amount of from 10 to 55% by weight, preferably from 12 to 45% by weight, based in each case on the weight of component (A1), of component (A2).

The thermoplastic polyurethanes used in the inventive molding compositions are preferably obtainable via a process as described below.

By way of example, TPUs may be prepared via reaction of (a) isocyanates with (b) compounds reactive toward isocyanates and having a molar mass of from 500 to 10000 g/mol, and, if appropriate, with (c) chain extenders having a molar mass of from 50 to 499 g/mol, if appropriate in the presence of (d) catalysts and/or (e) conventional auxiliaries and/or additives. Among component (e) are also hydrolysis stabilizers, such as polymeric and low-molecular-weight carbodiimides.

The sing components and processes for preparing the preferred polyurethanes will be described by way of example below. The components (a), (b), and also, if appropriate, (c), (d), and/or (e) conventionally used in the preparation of the polyurethanes will be described by way of example below:

a) Organic isocyanates (a) which may be used are well-known aliphatic, cycloaliphatic, araliphatic, and/or aromatic isocyanates, for example tri-, tetra-, penta-, hexa-, hepta-, and/or octameathylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, and/or dicyclohexylmethane 4,4'-, 2,4'- and 2,2'-diisocyanate, diphenylmethane 2,2'-, 2,4'-, and/or 4,4'-diisocyanate (MDI), naphthylene 1,5-diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate, and/or phenylene diisocyanate.

b) Compounds (b) which may be used, these being reactive toward isocyanates, are the well-known compounds reactive toward isocyanates, for example polyesterols, polyetherols, and/or polycarbonatediols, these usually also being combined under the term "polyols", having molar masses of from 500 to 8000 g/mol, preferably from 600 to 6000 g/mol, in particular from 800 to 4000 g/mol, and preferably having an average functionality of from 1.8 to 2.3, preferably from 1.9 to 2.2, in particular 2. It is preferable to use polyether polyols, such as those based on well-known starter substances and on conventional alkylene oxides, e.g. ethylene oxide, propylene oxide, and/or butylene oxide, preference being given to polyecterols based on propylene 1,2-oxide and ethylene oxide, and in particular polyoxytetramethylene glycols. The polyetherols have the advantage of having greater hydrolysis resistance than polyesterols.

c) The chain extenders (c) used may comprise well-known aliphatic, araliphatic, aromatic and/or cycloaliphatic compounds having a molar mass of from 50 to 499 g/mol, preferably difunctional compounds, such as diamines and/or alkanediols having from 2 to 10 carbon atoms in the alkylene radical, in particular, 1,4-butanediol, 1,6-hexanediol, and/or di-, tri-, tetra-, penta-, hexa-, hepta-, octa-, nona- and/or decaalkylene glycols having from 3 to 8 carbon atoms, and preferably corresponding oligo- and/or polypropylene glycols, and use may also be made of a mixture of the chain extenders.

d) Suitable catalysts which in particular accelerate the reaction between the NCO groups of the diisocyanates (a) and the hydroxy groups of the structural components (b) and (c) are the conventional tertiary amines known from the prior art, e.g. triethylamine, dimethylcyclohexylamine, N-methylmorpholine, N,N'-dimethylpiperazine, 2-(dimethylamhoethoxy)-ethanol, diazabicyclo[2.2.2]octane and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like. The amounts usually used of the catalysts are from 0.0001 to 0.1 part by weight per 100 parts by weight of polyhydroxy compound (b).

e) Alongside catalysts (d), conventional auxiliaries and/or additives (e) may also be added to the structural components (a) to (c). By way of example, mention may be made of surface-active substances, fillers, flame retardants, nucleating agents, antioxidants, lubricants and mold-release agents, dyes and pigments, further stabilizers if appropriate in addition to the inventive inhibitors, e.g. stabilizers active in relation to hydrolysis, light, heat or discoloration, inorganic and/or organic fillers, reinforcing agents, and plasticizers. In one preferred embodiment, component (e) also includes hydrolysis stabilizers, such as polymeric and low-molecular-weight carbodiimides.

Alongside the components a) and b) mentioned, and, if appropriate, c), d), and e), it is also possible to use chain regulators, usually having a molar mass of from 31 to 499 g/mol. These chain regulators are compounds which have only one functional group reactive toward isocyanates, examples being monofunctional alcohols, monofunctional amines, and/or monofunctional polyols. These chain regulators can be used for controlled adjustment of the flow behavior of the TPUs. The amount which may generally be used of chain regulators is from 0 to 5 parts by weight, preferably from 0.1 to 1 part by weight, based on 100 parts by weight of component b), and the chain regulators are defined as part of component c).

Further details concerning the abovementioned auxiliaries and additives can be found in the technical literature.

The molar ratios of the structural components (b) and (c) may be varied relatively widely in order to adjust the hardness of the TPUs. Molar ratios which have proven successful are from 10:1 to 1:10 for component (b) in relation to the total amount of cha extenders (c) to be used, in particular from 1:1 to 1:4, and the hardness of the TPUs here rises as content of (c) increases.

Chain extenders (c) are also preferably used for preparation of the TPUs.

The reaction can take place with conventional indices, preferably with an index of from 60 to 120, particularly preferably with an index of from 80 to 110 The index is defined via the ratio of the total of isocyanate groups used during the reaction in component (a) to the groups reactive toward isocyanates, i.e. to the active hydrogen atoms, in components (b) and (c). If the index is 100, there is one active hydrogen atom, i.e. one function reactive toward isocyanates, in components (b) and (c) for every isocyanate group in component (a). If the indices are above 100, there are more isocyanate groups than OH groups.

The TPUs may be prepared by the known processes, continuously, for example using reactive extruders or by the belt process, by the one-shot or the prepolymer method, or batchwise by the known prepolymer process. The components (a), (b) and, if appropriate, (c), (d), and/or (e) reacting in these processes may be mixed in succession or simultaneously with one another, whereupon the reaction immediately begins.

In the extruder process, the structural components (a), (b), and also, if appropriate, (c), (d), and/or (e), are introduced individually or in the form of a mixture into the extruder, and reacted, e.g. at temperatures of from 100 to 280° C., preferably from 140 to 250° C., and the resultant TPU is extruded, cooled, and pelletized.

For the purposes of the present invention the component (A2) used very particularly preferably comprises thermoplastic polyester polyurethanes whose Shore hardness A, determined to DIN 53505, is in the range from 75 to 90. Components more particularly preferred in these thermoplastic polyester polyurethanes are MDT (diphenylmethane diisocyanate) and polyesters composed of adipic acid and butanediol.

By way of example, other suitable elastomers which may be mentioned are thermoplastic polyurethanes described by way of example in EP 0 115 846 MA, EP 0 115 847 A2, and EP 0 117 664 A1.

The present invention therefore also provides a molding composition described above also comprising up to 50% by weight, based on the weight of component (A1), of at least one polyurethane as component (A2), if appropriate in addition to component (D1) and/or (D2) and/or (D3) and/or (D4) and/or (D5) and/or (D6) and/or (C).

The present invention also more preferably provides a molding composition described above also comprising up to 50% by weight, based on the weight of component (A1), of at least one thermoplastic polyurethane as component (A2), if appropriate in addition to component (D1) and/or (D2) and/or D3) and/or (D4) and/or (D5) and/or (D6) and/or (C).

The present invention therefore also provides a molding composition described above also comprising up to 50% by weight, based on the weight of component (A1), of at least one thermoplastic polyester polyurethane whose Shore hardness A, determined to DIN 53505, is in the range from 75 to 90, as component (A2), if appropriate in addition to component (D1) and/or (D2) and/or (D3) and/or (D4) and/or (D5) and/or (C).

According to another embodiment of the present invention, the inventive molding compositions also comprise at least one elastomeric polymer or elastomer as component (A3), if appropriate in addition to component (D1) and/or (D1) and/or (D3) and/or (D4) and/or (D5) and/or (D6), (C), and/or (A2). This at least one elastomeric polymer or elastomer is more preferably used as impact-modifying polymer.

The amount of component (A3) preferably present in the inventive molding compositions is up to 50% by weight, more preferably up to 45% by weight, and in particular up to 40% by weight, based in each case on the weight of component (A1).

Preferred types of these elastomers are those known as ethylene-propylene (EPM) rubbers or ethylene-propylenediene (EPDM) rubbers.

EPM rubbers generally have practically no residual double bonds, whereas EPDM robbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4,-octadiene, cyclic dienes, such as cyclopentadiene, cyclohexadienes, cyclooctadienes and dicyclopentadiene, and also alkenylnorbornenes, such as 5-ethylidene-2-norbornene, and tricyclodienes, such as 3-methyltricyclo[5.2.1.0$^{2,6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, more preferably from 0.75 to 20% by weight, and in particular from 1 to 8% by weight, based on the total weight of the rubber.

The EPDM rubbers may also have been grafted with other monomers, e.g. with glycidyl (meth)acrylates, (meth)acrylates and (meth)acrylamides.

Copolymers of ethylene with esters of (meth)acrylic acid are another group of preferred rubbers. The rubbers may also comprise monomers comprising epoxy groups. These monomers comprising epoxy groups are preferably incorporated into the rubber by adding to the monomer mixture monomers comprising epoxy groups and having the general formulae I or II

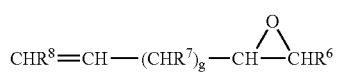
(I)

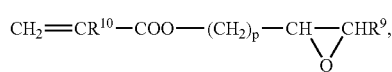
(II)

where $R_6$ to $R_{10}$ are hydrogen or alkyl groups having 1, 2, 3, 4, 5, or 6 carbon atoms, and m is 0, 1, 2, 3, 4, 5, 6, 7, 8, 9, 10, 11, 12, 13, 14, 15, 16, 17, 18, 19, or 20 and g is 0, 1, 2, 3, 4, 5, 6, 7, 8, 9 or 10, and p is 0, 1, 2, 3, 4, or 5.

R6 to R8 are preferably hydrogen, where m is 0 or 1 and g is 1. The corresponding compounds are allyl glycidyl ether and vinyl glycidyl ether.

Preferred compounds of the formula (II) are esters of acrylic acid and/or methacrylic acid, where these esters comprise epoxy groups, examples being glycidyl acrylate and glycidyl methacrylate.

The copolymers are advantageously composed of from 50 to 98% by weight of ethylene, and from 0 to 20% by weight of monomers comprising epoxy groups, the remaining amount being (meth)acrylates.

Particular preference is given to copolymers composed of from 50 to 98% by weight, in particular from 55 to 95% by weight, of ethylene, from 0.1 to 40% by weight, in particular from 0.3 to 20% by weight, of glycidyl acrylate and/or glycidyl methacrylate, (meth)acrylic acid and/or maleic anhydride, and from 1 to 50% by weight, in particular form 10 to 40% by weight, of n-butyl acrylate and/or 2-ethylhexyl acrylate.

Other preferred (meth)acrylates are the methyl, ethyl, propyl, isobutyl and tert-butyl esters. Besides these, other comonomers which may be used are vinyl esters and vinyl ethers.

The ethylene copolymers described above may be prepared by processes known per se, preferably by random copolymerization at high pressure and elevated temperature. Appropriate processes are well known.

Other preferred elastomers are emulsion polymers whose preparation is described, for example, by D. C. Blackley in the monograph "Emulsion polymerization" Applied Science Publishers LTD, London 1975. The emulsifiers and catalysts which can be used are known per se.

In principle it is possible to use homogeneously structured elastomers or else those with a shell structure. The shell-type structure is determined, inter alia, by the sequence of addition of the individual monomers. The morphology of the polymers is also affect by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (particularly preferably with glass transition temperature below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, o-methylstyrene, p-methylstyrene, or acrylates or methacrylates, such as methyl acrylate, ethyl acrylate or methyl methacrylate. Besides these, it is also possible to use relatively small proportions of other comonomers here.

It has proven advantageous in some cases to use emulsion polymers which have reactive groups at the surface. Examples of groups of this type are epoxy, amino and amide groups, also functional groups which may be introduced by concomitant use of monomers of the general formula

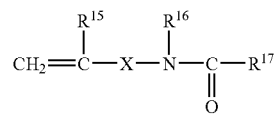

where the substituents are defined as follows:
$R^{15}$ is hydrogen or an alkyl group having 1, 2, 3, or 4 carbon atoms,
$R^{16}$ is hydrogen, an alkyl group having 1, 2, 3, 4, 5, 6, 7, or 8 carbon atoms or an aryl group having 6, 7, 8, 9, 10, 11, or 12 carbon atoms, in particular phenyl,
$R^{17}$ is hydrogen, an alkyl group having 1, 2, 3, 4, 5, 6, 7, 8, 9, or 10 carbon atoms, an aryl group having 6, 7, 8, 9, 10, 11, or 12 carbon atoms, or —$OR^{18}$,
$R^{18}$ is an alkyl group having 1, 2, 3, 4, 5, 6, 7, or 8 carbon atoms, or an aryl group having 6, 7, 9, 9, 10, 11, or 12 carbon atoms, which may, if appropriate, have substitution by O— or N-containing groups,
X is a chemical bond, an alkylene group having 1, 2, 3, 4, 5, 6, 7, 8, 9, or 10 carbon atoms, or an arylene group having 6, 7, 8, 9, 10, 11, or 12 carbon atoms, or

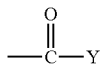

where
Y is OZ or NH-Z, and
Z is an alkylene group having 1, 2, 3, 4, 5, 6, 7, 8, 9, or 10 carbon atoms, or an arylene group having 6, 7, 8, 9, 10, 11, or 12 carbon atoms.

The graft monomers described in EP 0 208 187 A2 and having the structure

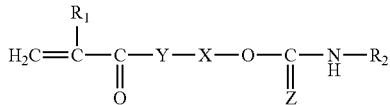

are also suitable for introduction of reactive groups at the surface.

Other examples which may be mentioned are acrylamide, methacrylamide, and substituted esters of acrylic acid or methacrylic acid, e.g. (N-text-butylamino)ethyl methacrylate, (N,N-dimethylamino)ethyl acrylate, (N,N-dimethylamino)methyl acrylate, and (N,N-diethylamino)ethyl acrylate.

The particles of the rubber phase may also have been crosslinked. Examples of crosslinking monomers are 1,3-butadiene, divinylbenzene, diallyl phthalate, butanediol diacrylate and dihydrodicyclopentadienyl acrylate, and also the cyclic monomeric compounds described in EP 0 050 265 A1, which have at least three ethylenically unsaturated groups whose polymerization rate is identical, examples being triallyl cyanurate, triallyl isocyanurate, trivinyl cyanurates, triallylbenzenes, trivinylbenzenes, and 1,3,5-triacryloylhexahydro-s-triazine.

It is also possible to use the monomers known as graft-linking monomers, i.e. monomers having two or more polymerizable double bonds which react at different rates during the polymerization. Preference is given to the use of those compounds in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft, monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a variety of other suitable graft-lining monomers; for further details concerning these compounds reference may be made here, by way of example, to the appropriate content of U.S. Pat. No. 4,148,846, for example in column 4, line 56 to column 5, line 58, and the entire content relevant here of that specification is incorporated into the context of the present application by way of reference.

The proportion of these crosslinking monomers in the impact-modifying polymers is generally up to 5% by weight, preferably not more than 3% by weight, based on the total weight of the impact-modifying polymers.

Some preferred emulsion polymers wilt be listed below. Mention may first be made here of graft polymers having a core and at least one outer shell, and having the following structure:

| Monomers for core | Monomers for envelope |
|---|---|
| 1,3-butadiene, isoprene, n-butyl acrylate, ethylhexyl acrylate, or a mixture of these, if appropriate together with crosslinking monomers | styrene, acrylonitrile, (meth)acrylates, if appropriate having reactive groups as described herein |

Instead of the graft polymers with a multishell structure, it is also possible to use homogeneous, i.e. single-shell elastomers composed of 1,3-butadiene, isoprene, and n-butyl acrylate, or of copolymers of these. These products, too, may be prepared via concomitant use of crosslinking monomers or of monomers having reactive groups.

The elastomers described may also be prepared by other conventional processes, e.g. via suspension polymerization.

It is also possible, of course, to use a mixture of the types of rubber listed above.

The present invention therefore also provides a molding composition described above also comprising up to 50% by weight, based on the weight of component (A1), of at least one elastomeric polymer or elastomer as component (A3), if appropriate in addition to component (D1) and/or (D2) and/or (D3) and/or (D4) and/or (D5) and/or D6) and/or (C) and/or (A2).

One preferred embodiment of the inventive molding compositions comprises either component (A2) or component (A3). Another embodiment of the inventive molding compositions comprises not only component (A2) but also component (A3), and in this case a more preferred embodiment of the molding compositions comprises up to 50% by weight, based on the weight of component (A1), of components (A2) and (A3), the percent by weight stated being based on the total of the percentages by weight of (A2) and (A3).

The inventive molding compositions may moreover comprise conventional additives and processing aids. Merely by way of example, mention may be made here of:
as component (D7):
plasticizers, the amount present in the inventive molding compositions preferably being from 0.001 to 5% by weight, based on component (A1);
as component (D8):

coupling agents, the amount present in the inventive molding compositions preferably being from 0.001 to 5% by weight, based on component (A1). As examples for coupling agents, suitable paraffins such as white oils are to be mentioned, among others, as component (D9):

pigments, the amount present in the inventive molding compositions preferably being from 0.001 to 5% by weight, based on component (A1);

as component (D10):

at least one compound from the class of 2-hydroxyphenylbenzotriazole derivatives and/or from the class of 2,2,6,6-tetramethyl-1-piperidine derivatives, preferably as UV stabilizers, the amount present in the inventive molding compositions preferably being from 0.001 to 5% by weight, based on component (A1). If a compound of component (D10) is present in the inventive molding composition, and has a secondary amine group, a further preference is that the inventive molding composition comprises no other organic compound having monodisperse molar mass distribution and having a secondary amine group, and no organic compound having monodisperse molar mass distribution and having a primary amine group. If a compound of component (D10) is present in the inventive molding composition and has a secondary amine group, a further preference is that the inventive molding composition comprises no other organic compound having monodisperse molar mass distribution and having a secondary amine group, no organic compound having monodisperse molar mass distribution and having a primary amine group, and, other than, if appropriate, a polyamide, no organic compound having polydisperse molar mass distribution and having a primary amine group, and no organic compound having polydisperse molar mass distribution and having a secondary amine group.

According to an especially preferred embodiment, the present invention also provides a molding composition as described above, additionally comprising, as component (D8), from 0.001 to 5% by weight, preferably from 0.01 to 4% by weight, more preferably 0.1 to 2% by weight, more preferably from 0.2 to 1% by weight, based on the weight of component (A1), of at least one coupling agent, preferably at least one suitable paraffin, more preferably at least one white oil, optionally in addition to component (D1) and/or (D2) and/or (D3) and/or (D4) and/or (D5) and/or (D6) and/or (D7) and/or (D9) and/or (D10) and/or (A2) and/or (A3) and/or (C). Especially preferred are molding compositions, essentially consisting of components (A1), (D1), (D2), (14) and (D8) and the zeolitic material.

The inventive thermoplastic molding compositions are prepared via mixing of the components in a manner known per se. The zeolitic material may be added simultaneously here or subsequently to component (A1). Component (A1) may be comminuated, ground, or pelletized prior to, during or after addition of the zeolitic material. Prior to, during, or after addition of the zeolitic material, component (A1) is in liquid form, for example in the form of a melt, in the form of a solution in a suitable solvent, or in the form of a dispersion in a suitable dispersion medium.

Once (A1) has been mixed with the zeolitic material, if solvent has been present it is at least to some extent remove preferably in essence completely removed.

Components (C), and also (D1), (D2), (D3), (D4), (D5), (D6), (D7), (D8), (D9), and/or (D10), if they are not liquids, are advantageously used in finely ground form. Products whose average particle size is smaller than 100 µm, preferably smaller than 50 µm, have particularly good suitability. Components (C), and also (D1), (D2), (D3), (4), (D5), (D6), (D7), (D8), (D9), and/or (D10) may also be added simultaneously, together, or in succession to component (A1), and specifically prior to, during, or after addition of the zeolitic material.

The components are advantageously mixed in an extruder, and the mixing process preferably takes place while component (A1) is molten.

The present invention therefore also provides a process for preparation of a molding composition described above, comprising mixing of at least one polyoxymethylene with a zeolitic material whose pore diameter is in the range from 0.3 to 0.5 nm, determined to DIN 66134 and DIN 66135, where the size of the particles of the zeolitic material is in the range from 3 to 7 µm, determined to ISO 13320.

The present invention also provides this process further comprising extrusion of a composition, comprising polyoxymethylene and zeolitic material, at a temperature in the range from 100 to 270° C.

An example of an advantage of this inventive extrusion process is that the zeolitic starting material used can comprise a zeolite with comparatively high water content, and that this is dried via the temperatures selected during the course of the extrusion process. This means that there is no need for pre-drying pre-treatment of the zeolitic material.

The present invention also provides a process for preparation of the inventive molding composition, comprising the steps of:
(i) melting of component (A1) and/or dissolution of component (A1) in at least one suitable solvent,
(ii) mixing of component (A1) during and/or after (i) with zeolitic material,
(iii) optionally, if component (A1) has been dissolved in at least one solvent according to (i), at least partial removal of the at least one solvent.

The present invention also provides a molding composition obtainable via the processes described above.

The term "molding composition" as used for the purposes of the present invention designates a composition of one of the abovementioned constitutions which can be deformed via at least one appropriate step. Accordingly, moldings can be produced via deformation of the inventive molding compositions. The molding compositions can also be converted into foils, films, and foams. The molding compositions therefore have advantageous mechanical properties for this type of use. By way of example, the tensile modulus of elasticity of appropriately reinforced molding compositions, examples being molding compositions appropriately reinforced via glass fiber addition, is at least 2,400 MPa, preferably 2,600 MPa determined by way of ISO 527, and their yield stress is at least 59.5 MPa, preferably at least 62.5 MPa, preferably at least 63.0 MPa, in each case determined by way of ISO 527.

The molding compositions may be molded via a shaping stop, e.g. via spray drying, injection molding, extrusion, compression molding, or pelletizing, to give moldings, such as pellets, beads, or tablets.

Other moldings can be produced from the inventive moldings. By way of example, inventive pellets can be melted and, if appropriate with addition of at least one suitable additive, processed to give a further molding. Examples of suitable additives are the abovementioned components (C), and (D1), (D2), (D3), (D4), (D5), (D6), (D7), (D8), (D9), and/or (D10). It is also possible to add at least one zeolitic material during the production of the further molding, examples being the preferred zeolitic material described above and/or additional component (A1) and/or (A2) and/or (A3). By way of example, further addition of component (D6) is preferred, an example being glass fibers, where the glass fibers may be used in the form of glass textiles, glass mats, glass nonwovens, and/or glass silk rovings, for example, or of cut glass silk composed of low-alkali E glass whose diameter is from 5 to 200 μm, preferably from 8 to 50 μm.

The present invention therefore also provides a molding which comprises at least 10% by weight, preferably at least 20% by weight, more preferably at least 50% by weight, and particularly preferably at least 90% by weight, for example 90, 91, 92, 93, 94, 95, 96, 97, 98, 99, or 100% by weight, of the inventive molding composition.

A particularly preferred molding according to the invention is a pelletized material which comprises 100% by weight of the inventive molding composition. A further preference is that the size of the particles of the pelletized material is in the range from 1 to 6 mm, more preferably from 1.5 to 5 mm, and particularly preferably from 2 to 4 mm. There is it essence no restriction on the shape of the moldings, and this may be cylindrical, lenticular, spherical, for example, or else any other shape, as a function of the specific production process.

For the purposes of the present invention, it is particularly preferable to provide moldings whose formaldehyde emission is at most 8 ppm, preferably at most 7 ppm, more preferably at most 6 ppm, and in particular at most 5 ppm, determined to VDA 275.

Another feature of the molding composition of the present invention and of the inventive use of zeolitic materials as described above, alongside the reduction in formaldehyde emission, is synergistic simultaneous utilization of another favorable effect of the zeolitic material: the nucleating effect during preparation of a molding composition.

The present invention therefore also provides the use of a zeolitic material, in particular of a zeolitic material described as preferred above, for reduction of the formaldehyde emission of a polyoxymethylene-containing molding composition and simultaneously as nucleating agent during preparation of the molding composition.

Another feature of the inventive molding compositions and moldings is very low formaldehyde emission with simultaneous good mechanical properties.

Another feature of the inventive molding compositions and moldings is very low formaldehyde emission with simultaneous good thermal stability.

Another feature of the inventive molding compositions and moldings is very low formaldehyde emission with simultaneous good thermal stability and with simultaneous good mechanical properties.

An example of a feature of preferred moldings, such as the preferred pellets described, is very low weight loss on aging of the pellets for 2 h at a temperature of 222° C. under nitrogen, at most 0.5%, more preferably at most 0.4%, for example 0.1%, 0.2%, 0.3%, or 0.4%.

Another example of a feature of preferred moldings, such as the preferred pellets described, is very low weight loss on aging of the pellets for 2 h at a temperature of 222° C. in air, at most 1.5%, more preferably at most 1.4%, for example 1.0%, 1.1%, 1.2%, 1.3%, or 1.4%.

In preferred embodiments, the moldings also comprise up to 50% by weight of component (A2) and/or component (A3), and/or up to 40% by weight of component (D6).

The present invention therefore also provides a process described above, also comprising processing of the molding composition to give a molding.

The present invention therefore also provides a molding, obtainable via a process described above, whose formaldehyde emission is at most 8 ppm, preferably at most 7 ppm, determined by way of VDA 275.

The present invention also provides a molding composition described above for production of a molding, where the molding is a toy or a part of a toy, or is an automobile accessory, aircraft accessory, or ship accessory, or a part of an automobile accessory, of an aircraft accessory, or of a ship accessory, or is packaging or a part of packaging, or is a container or a part of a container, or is a household device or a pan of a household device, or is a medical device or a part of a medical device, or is a constituent of a cosmetic item, or is a part of an electrical or electronic apparatus, or is an apparatus used in house construction or a part of such an apparatus.

Examples of specific uses are clips, fasteners, snap connectors, spring elements, loudspeaker grilles, valve bodies for WC systems, shower heads, rollers, levers, sliding hearings, guide bearings, guides for, by way of example, motor-vehicle sliding roofs, gears, transmission components, adjusting drives, food packaging, cosmetics packaging, and cosmetics displacement mechanisms, for example those in lipsticks or deodorants, brew units for coffee machines, conveyor-chain links, tank inserts, such as a flange, anti-surge cup, or tank cover, frames for fuel filters, sprinkler systems, switches, ball sockets for joints, pendulum supports for motor vehicles, non-return valves, windshield-washer nozzles for motor vehicles, inner tubes for Bowden cables, holders for sun visors for motor vehicles, press buttons, wind-up mechanisms for safety belts, grinders, outsert chassis, chair backrests, gas meters (measurement-chamber casing and functional parts), insulating compositions, filling compositions, window fittings or door fittings, computer parts, printer parts, and decorative items.

In the following, preferred embodiments, i.e. molding compositions, moldings, processes, and uses of the present invention are listed resulting from the following embodiments 1 to 31 including the combinations of these embodiments as explicitly given:

1. A molding composition, comprising from 10 to 99999% by weight of at least one polyoxymethylene as component (A1) and from 0.001 to 10% by weight, based on the weight of component (A1) present in the molding composition, of at least one zeolitic material whose pore diameter is in the range from 0.3 to 0.5 nm, determined to DIN 66134 and DIN 66135, wherein the size of the particles of the zeolitic material is in the range from 3 to 7 μm, determined to ISO 13320.
2. The molding composition according to embodiment 1, wherein the pore diameter of the zeolitic material is in the range from 0.37 to 0.43 nm.
3. The molding composition according to embodiment 1 or 2, wherein the size of the particles of the zeolitic material is in the range from 4 to 6 μm, determined to ISO 13320.
4. The molding composition according to any of embodiments 1 to 3, comprising from 0.05 to 0.50% by weight of the zeolitic material, based on the weight of component (A1) present in the molding composition.
5. The molding composition according to any of embodiments 1 to 4, wherein the molar Si:Al ratio, calculated as molar $SiO_2:Al_2O_3$ ratio, of the zeolitic material is in the range up to 5:1.

The molding composition according to any of embodiments 1 to 5, wherein the size of at least 90% of the primary crystals of the zeolitic material is in the range from 1.5 to 3.0 μm, determined by way of SEM.

7. The molding composition according to any of embodiments 1 to 6, wherein at least 75% by weight of the zeolitic material is not present in the H form.
8. The molding composition according to any of embodiments 1 to 7, wherein the molar Si:Al ratio, calculated as molar $SiO_2.Al_2O_3$ ratio, of the zeolitic material is in the range from 1:1 to 2:1, the size of at least 95% of the primary crystals of the zeolitic material is in the range from 1.75 to 2.75 µm, determined by way of SEM, and at least 95% by weight of the zeolitic material is not present in the H form.

9. The molding composition according to any of embodiments 1 to 8, wherein the molding composition comprises no spiro compound comprising at least one triazine 10. The molding composition according to any of embodiments 1 to 9, wherein the molding composition comprises no organic compound having monodisperse molar mass distribution comprising at least one primary amino group and/or at least one secondary amino group.

11. The molding composition according to any of embodiments 1 to 10, also comprising from 0.005 to 2% by weight, based on the weight of component (A1), of a stabilizer as component (D1).

12. The molding composition according to embodiment 11, wherein component (D1) is a sterically hindered phenol and the ratio by weight of phenol to zeolitic material is in the range from 7:1 to 1.2

13. The molding composition according to any of embodiments 1 to 12, also comprising from 0.001 to 2% by weight, based on the weight of component (A1), of at least one polyamide as component (D2).

14. The molding composition according to any of embodiments 1 to 13, also comprising from 0.002 to 2% by weight, based on the weight of component (A1), of an alkaline earth metal silicate and/or of an alkaline earth metal glycerophosphate as component (D3).

15. The molding composition according to any of embodiments 1 to 14, also comprising from 0.01 to 5% by weight, based on the weight of component (A1),
of at least one ester obtainable via reaction of at least one saturated or unsaturated aliphatic carboxylic acid having from 10 to 40 carbon atoms with at least one polyol or with at least one saturated aliphatic alcohol having from 2 to 40 carbon atoms, and/or
of at least one amide obtainable via reaction of at least one saturated or unsaturated aliphatic carboxylic acid having from 10 to 40 carbon atoms with an amine having from 2 to 20 carbon atoms; and/or
of at least one ether obtainable via reaction of at least one alcohol with at least one ethylene oxide,
as component (D4).

16. The molding composition according to any of embodiments 1 to 15, also comprising from 0.01 to 5% by weight, based on the weight of component (A1), of talc as component (C).

17. The molding composition according to any of embodiments 1 to 16, also comprising white oil as component (D8) from 0.01 to 5% by weight, based on the weight of component (A1).

18. The molding composition according to any of embodiments 1 to 17, wherein the at least one polyoxymethylene is at least one polyoxymethylene homopolymer or at least one polyoxymethylene copolymer, or a mixture composed of at least one polyoxymethylene homopolymer and at least one polyoxymethylene copolymer.

19. The molding composition according to any of embodiments 1 to 18, also comprising up to 55% by weight, based on the weight of component (A1), of at least one polyurethane as component (A2).

20. The molding composition according to embodiment 19, wherein the polyurethane is a thermoplastic polyester polyurethane whose Shore hardness A, determined to DIN 53505, is in the range from 75 to 90.

21. The molding composition according to any of embodiments 1 to 20, whose formaldehyde emission is at most 8 ppm, preferably at most 7 ppm, determined to VDA 275, 22. Use of a zeolitic material as a constituent of a molding composition comprising at least one polyoxymethylene for reduction of the formaldehyde emission of the molding composition.

23. The use according to embodiment 22, wherein the pore diameter of the zeolitic material is in the range from 0.3 to 0.5 nm, determined to DIN 66134 and DI 66135.

24. The use according to embodiment 22 or 23, wherein the size of the particles of the zeolitic material is in the range from 3 to 7 µm, determined to ISO 13320.

25. The use according to any of embodiments 22 to 24 for reduction of the formaldehyde emission of the molding composition to a value of at most 8 ppm, preferably at most 7 ppm, determined to VDA 275.

26, The use according to any of embodiments 22 to 25, wherein no organic compound having monodisperse molar mass distribution and having a primary amino group and/or secondary amino group is used as a constituent of the molding composition for reduction of the formaldehyde emission of the molding composition.

27. A process for preparation of a molding composition according to any of embodiments 1 to 21, comprising mixing of at least one polyoxymethylene with a zeolitic material whose pore diameter is in the range from 0.3 to 0.5 nm, determined to DIN 66134 and DIN 66135, wherein the size of the particles of the zeolitic material is in the range from 3 to 7 µm, determined to ISO 13320.

28. The process according to embodiment 27, comprising extrusion of a composition, comprising polyoxymethylene and zeolitic material, at a temperature in the range from 100 to 270° C.

29. The process according to embodiment 27 or 28, also comprising processing of the molding composition to give a molding.

30. A molding, obtainable by a process according to embodiment 29, whose formaldehyde emission is at most 8 ppm, preferably at most 7 ppm, determined by way of VDA 275.

31. The use of a molding composition according to any of embodiments 1 to 21, or of a molding composition, obtainable by a process according to embodiment 27 or 28, for production of a molding, wherein the molding is a toy or a part of a toy, or is an automobile accessory, aircraft accessory, or ship accessory, or a pant of an automobile accessory, of an aircraft accessory, or of a ship accessory, or is packaging or a part of packaging, or is a container or a part of a container, or is a household device or a part of a household device, or is a medical device or a part of a medical device, or is a constituent of a cosmetic item, or is a part of an electrical or electronic apparatus, or is an apparatus used in house construction or a part of such an apparatus.

FIGS. 1 to 9 and the examples illustrate the present invention.

The inventive zeolitic material is a zeolite in the sodium form of LTA type whose molar Si:Al ratio, calculated as $SiO_2:Al_2O_3$, is 1:1, and which has 8-ring pores, and whose pore diameter, determined by way of DIN 66134 and DIN 66135, is 0.41 nm. The material is commercially available (Purmol 4ST from Zeochem, CH). This material corresponds to the □ the graph.

The comparative material is also a zeolite in the sodium form of LTA type whose molar Si:Al ratio, calculated as $SiO_2:Al_2O$, is 1:1, and which has 8-ring pores, and whose pore diameter, determined by way of DIN 66134 and DIN 66135, is about 0.4 nm. The material is commercially available (Zeosorb 42 from Tricat Zeolites GmbH, Bitterfeld, Germany). This material corresponds to the Δ in the graph.

Figure 1:
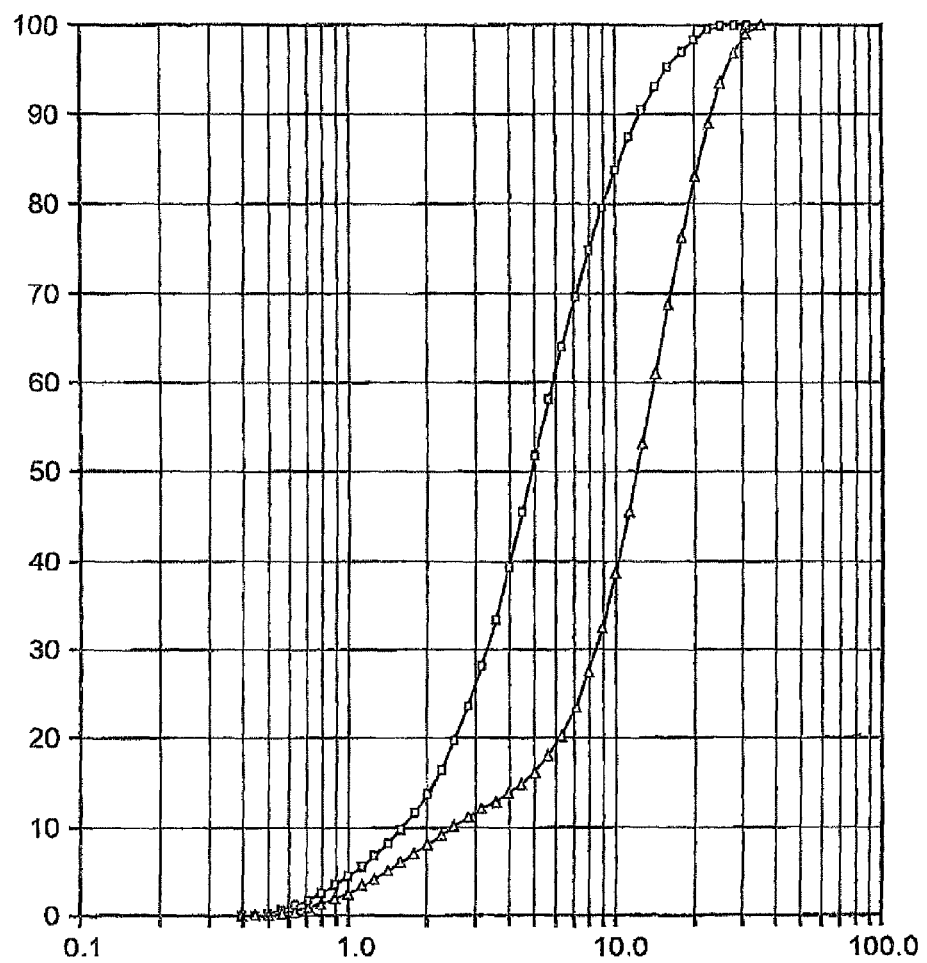
FIG. 1: shows a comparison of the particle sizes of an inventive zeolitic material and of a comparative material. The curves shown were determined to ISO 13320. Particle size in µm is plotted logarithmically on the abscissa. The transit % of the particles is plotted linearly on the ordinate.
Figure 2:
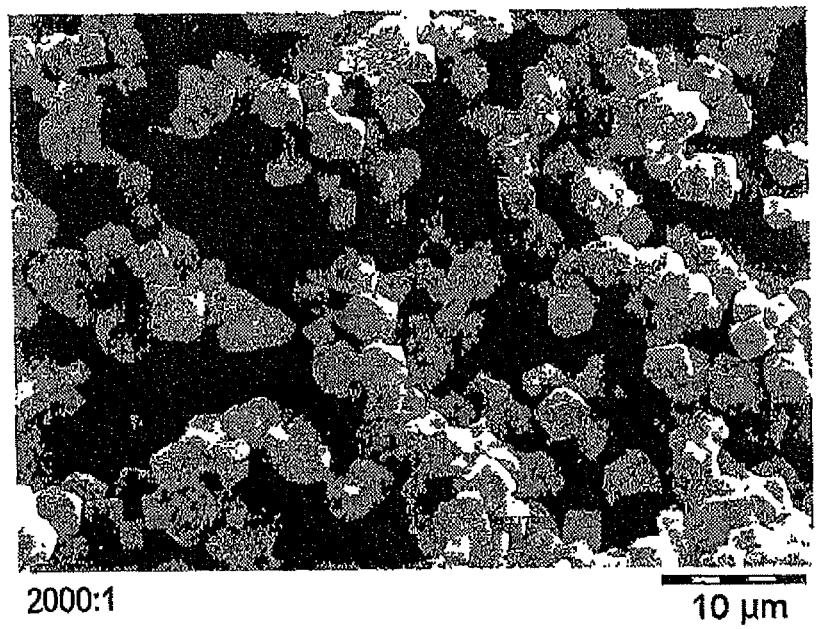

FIG. 2: shows an inventive material (Purmol 4ST, see description of FIG. 1) in an SE micrograph at 2000:1 magnification.

Figure 3:

FIG. 3: shows an inventive material (Purmol 4ST, see description of FIG. 1) in an SE micrograph at 10000:1 magnification.

Figure 4:
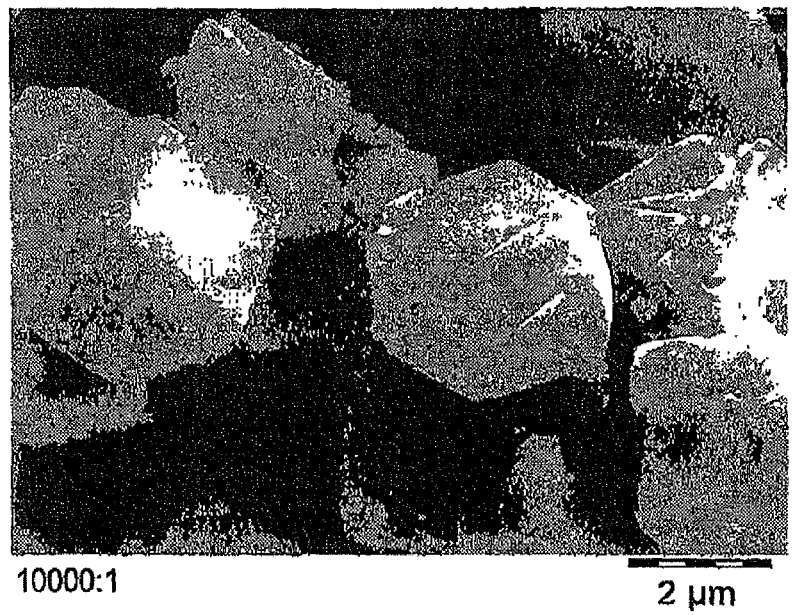

FIG. 4: shows an inventive material (Purmol 4ST, see description of FIG. 1) in an SE micrograph at 10000:1 magnification.

Figure 5:
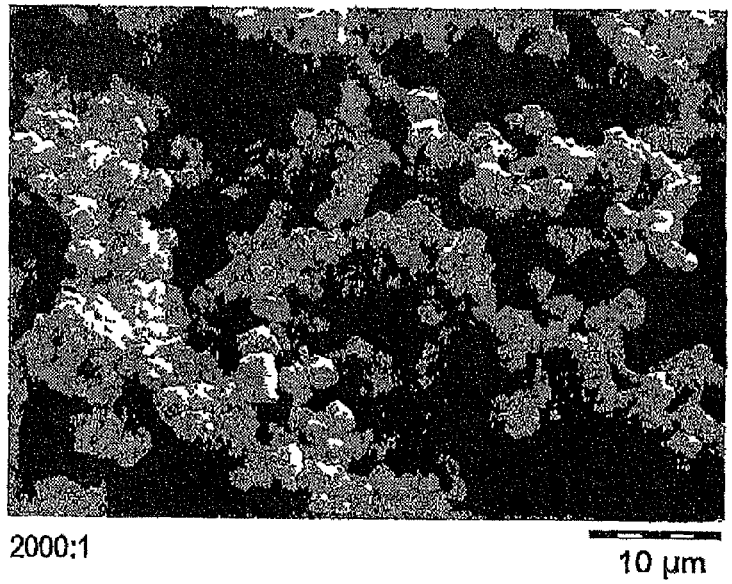

FIG. 5: shows a comparative material (Zeosorb 42, see description of FIG. 1) in an SE micrograph at 2000.1 magnification.

Figure 6:
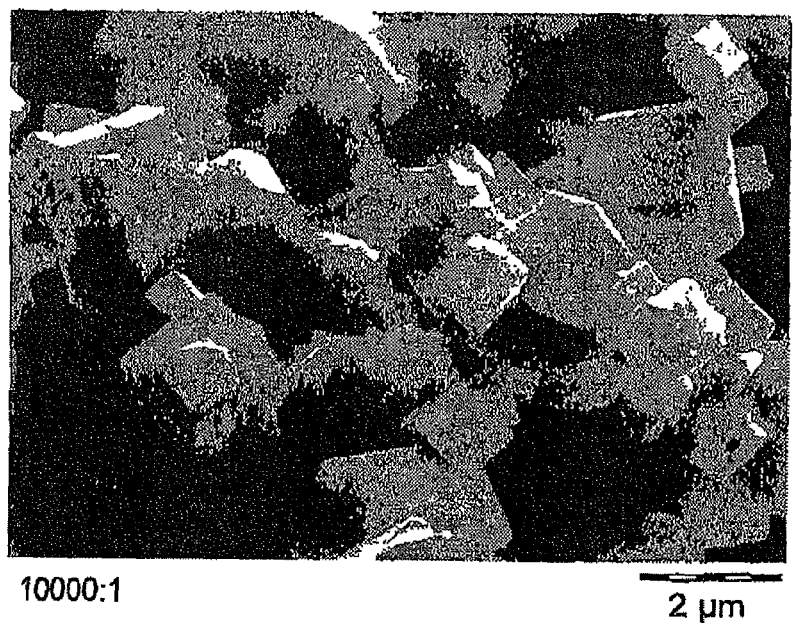

FIG. 6: shows a comparative material (Zeosorb 42, see description of FIG. 1) in an SE micrograph at 10000:1 magnification.

Figure 7:
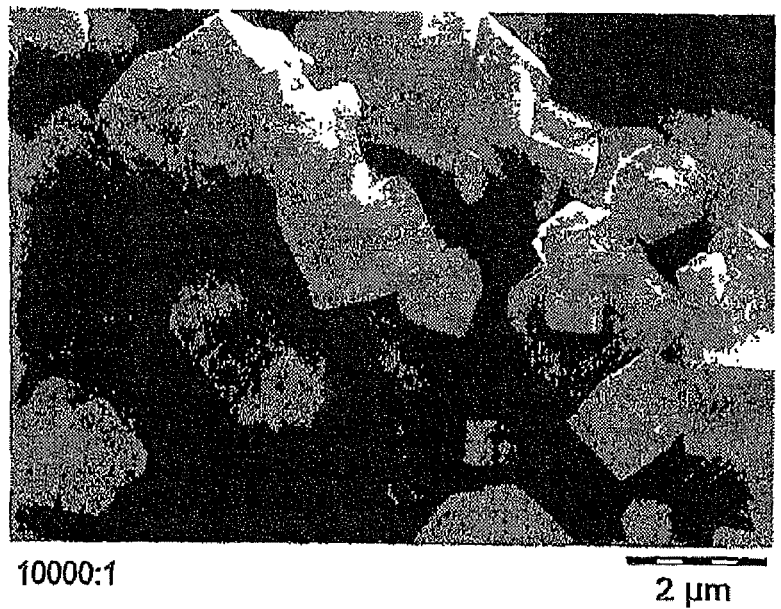

FIG. 7: shows a comparative material (Zeosorb 42, see description of FIG. 1) in an SE micrograph at 10000:1 magnification.

Figure 8:
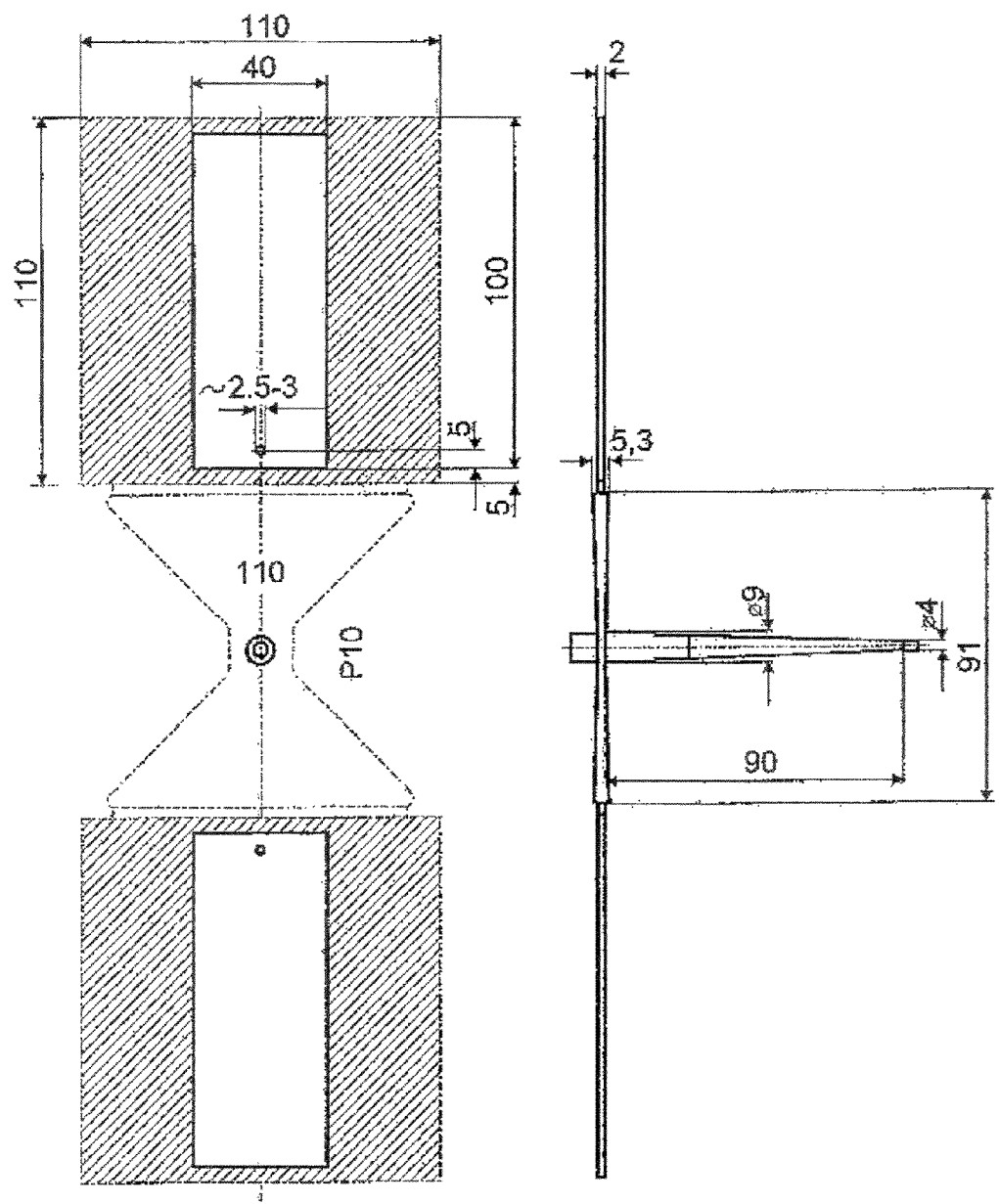

FIG. 8: shows the multiplate mold used for the purposes of the present invention to determine formaldehyde emission to VDA 275 and to produce the plaques. The right-hand side of FIG. 8 shows a section from the side of the multiplate mold. Above and below are the two cavities, connected to one another via the inlet extending from right to left and shaped like a truncated cone, and the two feed apertures. The material to be shaped to give plaques is injected via the cone-shaped inlet extending from right to left and depicted on the right-hand side of FIG. 8, and becomes distributed upward and downward within the two feed apertures. These feed apertures are depicted as the triangular shapes extending upward and downward as far as the two cavities, in the century arranged structure depicted with hatching on the left-hand side of FIG. 8. The left-hand side of FIG. 8 shows a plan view of the multiplate mold. All of the numerals stated are in mm.

Figure 9:
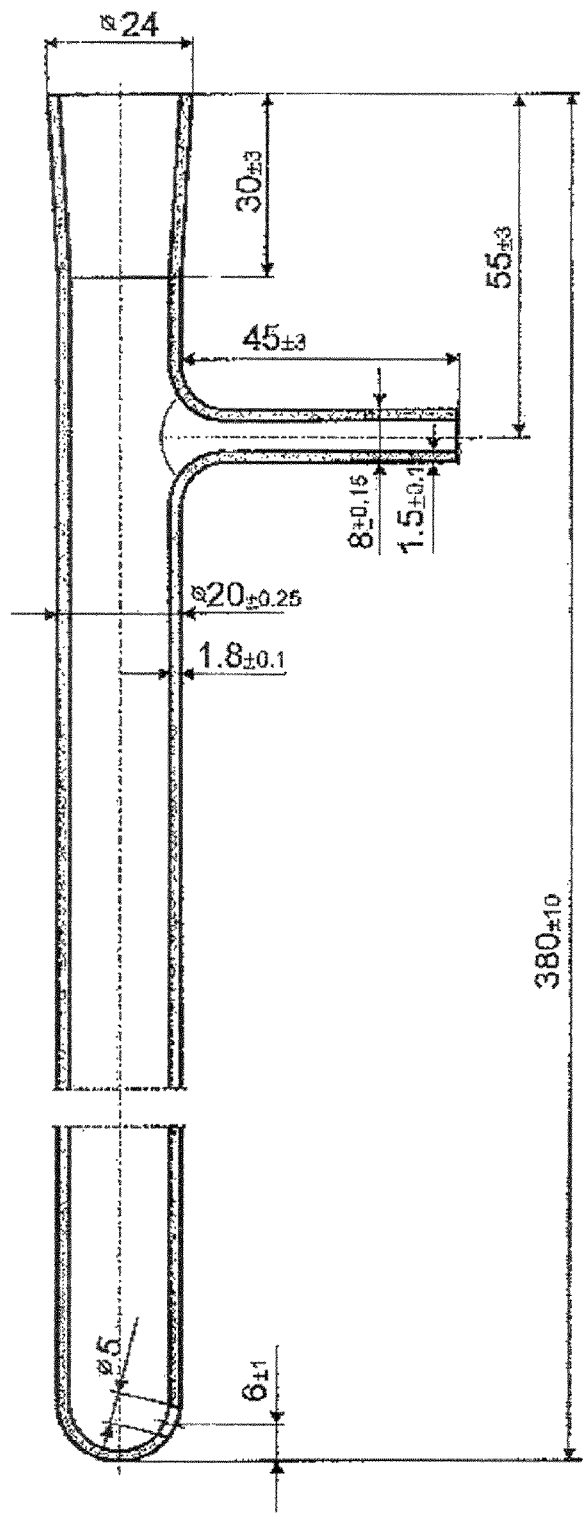

FIG. 9: shows a lateral section of the glass apparatus used to determine thermal stability (see section "Examples—test methods—Thermal stability" below), with two apertures above and on the right-hand side. All of the numerals stated am in mm.

EXAMPLES

Further Test Methods

Molar Mass Determination

The molar masses of the polymers were determined via size-exclusion chromatography in an SEC apparatus. This SEC apparatus was composed of the following combination of separating columns: a preliminary column of length 5 cm and diameter 7.5 mm, a second linear column of length 30 cm and diameter 7.5 mm. The separating material in both columns was PL-HFIP gel from Polymer Laboratories. The detector used comprised a differential refratometer from Agilent G1362 A. A mixture composed of hexafluoroisopropanol with 0.05% of potassium trifluoroacetate was used as eluent. The flow rate was 0.5 ml/min, the column temperature being 40° C. 60 microliters of a solution at a concentration of 1.5 g of specimen per liter of eluent were injected. This specimen solution had been filtered in advance through Millipor Millex GF (pore width 0.2 micrometers). Narrowly distributed PMMA standards from PSS (Mainz, DE) with molar masses M from 505 to 2740000 g/mol were used for calibration.

Thermal Stability $WLN_2$ weight loss (WL) in percent from a specimen composed of 1.2 g of pellets on heating to 222° C. in nitrogen for 2 hours.

WL air: weight loss (WL) in percent from a specimen composed of 1.2 g of pellets on heating to 222° C. in air for 2 hours. For the apparatus use see FIG. 9 and the relevant description of the figures.

At the start of the WL determination process, the balance used for this purpose was tared. The specimen, in a twin-walled vessel composed of two test tubes, one placed inside the other (normal test tube, 100×10 mm; specially prepared, thick-walled test tube, 100×12.5 mm) was weighed out with accuracy of 0.1 mg.

A thin copper wire of length about 400 mm was secured to the upper lip of the outer tube. This was used to suspend the twin-walled vessel in a specific apparatus (see FIG. 9 and the relevant description of the figures). For WL determination in nitrogen, the upper half of the apparatus was used for 15 min. for adaptation to the specific atmosphere, i.e. with no temperature increase. The test tubes were then lowered onto the base, where they were kept at 222° C. for 2 h. The nitrogen flow rate was 15 l/h, checked with the aid of a Rota for each individual test tube.

After expiry of 2 h, the twin-walled vessels were withdrawn from the apparatus with the aid of the copper wire and cooled in air for from 20 to 25 min. The weight was then again measured on the balance, and WL was calculated from WL[%]–(Loss×100/initial weight).

Tensile Modulus of Elasticity

Tensile modulus of elasticity was determined to ISO 527 (23° C.; 1 mm/min).

Yield Stress

Yield stress was determined to ISO 527 (23° C.; 50 mm/min).

DSC, Crystallization Rate

Crystallization temperature $T_{CP}$ and crystallization rate were determined to DIN EN 53765.

Components Used for the Examples According to Tables 1 to 4

Component (A1)

Polyoxymethylene copolymer composed of 96.2% by weight of trioxane and 3.8% by weight of butanediol formal. The product also comprised about 6-8% by weight of unconverted trioxane and 5% by weight of thermally unstable fractions. Once the thermally unstable fractions had been degraded, the melt volume rate of the copolymer was 7.5 $cm^3$/10 min. (190° C./2.16 kg, to ISO 1133).

Zeolitic Material

B1: Purmol 4ST from Zeochem AG, Uetikon, CH

B2: 6278/03-48; Zn-MOF5, a zinc-containing, porous crystalline material; surface area; 2380 $m^2$/g; pore volume: 0.84 ml/g; average pore size: 2.3 nm B3 Zeocat ZZ0176 from Zeochem AG, Uetikon, CH, MI structure, sodium form, Si:Al ratio=420, 10-ring pores, pore diameter: 0.55 nm B4: Zeocat Z6-02-03 from Zeochem AG, Uetikon, CH, FAU structure, sodium form, Si:Al ratio=2.75, 12-ring pores, pore diameter: 0.74 nm B5: Zeocat Z6-01-01 from Zeochem AG, Uetikon, CH, FAU structure, sodium form, Si:Al ratio=2.7-3, 12-ring pores, pore diameter: 0.74 nm B6: Zeocat PZ 2/25 from Zeochem AG, Uetikon, CH, WY structure, sodium form, Si:Al ratio=12, 10-ring pores, pore diameter 0.55 nm B7: Zeosorb 42; see description of FIG. 1

B8: Zeocat PZ 2/50 from Zeochem AG, Uetikon, CH, NM structure, H form, Si:Al ratio=12, 10-ring pores, pore diameter 0.55 nm B9: FM-8 from Zeochem AG, Uetikon, CH, MOR structure, sodium form, Si:Al ratio=6, 12-ring pores, pore diameter 0.7 nm Component (C)

Talc (Micro-Talc LT. Extra)

| Particle size | % |
|---|---|
| <20 μm | 100 |
| <10 μm | 99 |
| <5 μm | 85 |
| <3 μm | 60 |
| <2 μm | 43 | determined by means of sedimentation analysis.

Component (D1)

Irganox® 245 from Ciba

Component (D2)

Polyamide oligomer with molar mass of about 3000 g/mol, prepared from caprolactam, hexamethylenediamine, adipic acid, and propionic acid (as molecular weight regulator) by a method based on Example 5-4 of U.S. Pat. No. 3,960,984 ("PA-dicapped"): a difference from that example was that propionic acid was used instead of acetic acid.

The molar HMD:adipic acid:caprolactam:propionic acid ratios were 13.1:11.2:17:4.2, whereas in Example 5-4 of U.S. Pat. No. 3,960,984 the molar HMD: adipic acid: caprolactam: acetic acid ratios were 13.1:12.1:13.6:2.

The comparatively high content of propionic acid permitted achievement of a markedly small fraction of from 18 to 35 meq/kg (mval/kg) of free amino end groups (Example 5-4 of U.S. Pat. No. 3,960,984:62.5 equiv./1 million g).

Component (D3)

Synthetic Mg silicate (Ambosol®, PQ France) with the following properties:

| | |
|---|---|
| Content of MgO | ≧14.8% by weight |
| Content of SiO$_2$ | ≧59% by weight |
| SiO$_2$:MgO ratio | 2.7 mol/mol |
| Bulk density | 20-30 g/100 ml |
| Loss on ignition | <25% by weight |

Component (D4)

Loxiol® P 1206 from Cognis (glycerol distearate)

Components Used for the Examples According to Table 5

Component (A1)

Polyoxymethylene copolymer composed of 96.2% by weight of trioxane and 3.5% by weight of ethanediol formal. The product also comprised about 2-5% by weight of unconverted trioxane and 5% by weight of thermally unstable fractions. Once the thermally unstable fractions had been degraded, the melt volume rate of the copolymer was 7.5 cm$^3$/10 min, (190° C./2.16 kg, to ISO 1133).

Zeolitic Material

B1: Purmol 4ST from Zeochem AG, Uetikon, CH

Component (D1)

Irganox® 245 from Ciba

Component (D2)

Polyamide Ultraid® C 3101 of BASF AG, Ludwigshafen

Component (D4)

Loxiol® P 1206 from Cognis (glycerol distearate)

Component (D8)

White oil

Preparation of Molding Compositions

To prepare the molding compositions, component (A1) was mixed at a temperature of 23° C. in a dry mixer with the amounts stated in the table of components (Bi), (C), and (Di). The resultant mixture was introduced into a twin-screw extruder with venting (ZSK 30 from Werner & Pfleiderer), homogenized at 230° C., and devolatilized, and the homogenized mixture was extruded in the form of a strand through a 3 mm die and pelletized by means of a Scheer strand pelletizer. The length of the cylindrical pellets was 3 mm and their diameter was 2.5 mm.

Downstream devolatilization was then carried out by treating 6 kg of POM pellets at 145° C. in a tower drier with an air stream of 0.6 m/s, using a volume flow of 12 l/h, and 50 g/(kg of air) of steam over a period of 5 h in countercurrent.

Moldings and Experimental Results

The constitutions of the moldings and the results of the tests are given in Tables 1 to 5.

TABLE 1

| Mixing specification: per kg of POM (=component (A1)) | | | | | | | | |
|---|---|---|---|---|---|---|---|---|
| D1 [% by weight] | 0.3500 | 0.3500 | 0.3500 | 0.3500 | 0.3500 | 0.3500 | 0.3500 | 0.3500 |
| D2 [% by weight] | 0.0400 | 0.0400 | 0.0400 | 0.0400 | 0.0400 | 0.0400 | 0.0400 | 0.0400 |
| D3 [% by weight] | 0.0500 | 0.0500 | 0.0500 | 0.0500 | 0.0500 | 0.0500 | 0.0500 | 0.0500 |
| D4 [% by weight] | 0.1500 | 0.1500 | 0.1500 | 0.1500 | 0.1500 | 0.1500 | 0.1500 | 0.1500 |

TABLE 1-continued

| Mixing specification: per kg of POM (=component (A1)) | | | | | | | | |
|---|---|---|---|---|---|---|---|---|
| C [% by weight] | 0.1250 | | 0.1250 | | 0.1250 | | | |
| B1 [% by weight] | | 0.100 | 0.100 | 0.200 | 0.200 | 0.250 | 0.350 | 0.400 |
| Thermal test in $N_2$ (WL, %) | 0.09 | 0.01 | 0.02 | 0.02 | 0.01 | 0.01 | 0.01 | 0.04 |
| Thermal test in air (WL, %) | 1.63 | 1.30 | 1.32 | 1.24 | 1.29 | 1.40 | 1.26 | 1.34 |
| VDA 275 [ppm] | 7 | 4 | 5 | 3 | 4 | 2 | 3 | 3 |

TABLE 2

| Mixing specification: per kg of POM (=component A) | | | | | | | | |
|---|---|---|---|---|---|---|---|---|
| D1 [% by weight] | 0.3500 | 0.3500 | 0.3500 | 0.3500 | 0.3500 | 0.3500 | 0.3500 | 0.3500 |
| D2 [% by weight] | 0.0400 | 0.0400 | 0.0400 | 0.0400 | 0.0400 | 0.0400 | 0.0400 | 0.0400 |
| D3 [% by weight] | 0.0500 | 0.0500 | 0.0500 | 0.0500 | 0.0500 | 0.0500 | 0.0500 | 0.0500 |
| D4 [% by weight] | 0.1500 | 0.1500 | 0.1500 | 0.1500 | 0.1500 | 0.1500 | 0.1500 | 0.1500 |
| C [% by weight] | 0.1250 | 0.1250 | 0.1250 | 0.1250 | 0.1250 | 0.1250 | 0.1250 | 0.1250 |
| B1 [% by weight] | | 0.1 | | | | | | |
| B2 [% by weight] | | | 0.1 | | | | | |
| B3 [% by weight] | | | | 0.1 | | | | |
| B4 [% by weight] | | | | | 0.1 | | | |
| B5 [% by weight) | | | | | | 0.1 | | |
| B6 [% by weight] | | | | | | | 0.1 | |
| B7 [% by weight] | | | | | | | | 0.1 |
| Thermal test in $N_2$ (WL, %) | 0.17 | 0.04 | 0.50 | 0.13 | 0.62 | 0.16 | 0.17 | 0.13 |
| Thermal test in air (WL, %) | 1.54 | 1.38 | 3.37 | 1.40 | 2.37 | 1.41 | 1.51 | 1.33 |
| VDA 275 [ppm] | 8 | 5 | 13 | 9 | 80 | 18 | 21 | 10 |

TABLE 3

| Mixing specification: per kg of POM (=component A) | | | | | | | |
|---|---|---|---|---|---|---|---|
| D1 [% by weight] | 0.350 | 0.350 | 0.350 | 0.350 | 0.350 | 0.350 | 0.350 |
| D4 [% by weight] | 0.150 | 0.150 | 0.150 | 0.150 | 0.150 | 0.150 | 0.150 |
| B3 [% by weight] | | 0.1 | | | | | |
| B1 [% by weight] | | | 0.1 | | | | |
| B2 [% by weight] | | | | 0.1 | | | |
| B6 [% by weight] | | | | | 0.1 | | |
| B8 [% by weight] | | | | | | 0.1 | |
| B9 [% by weight] | | | | | | | 0.1 |
| DSC ($T_{CP}$) [° C.] | 138.9 | 139.5 | 139.4 | 140.7 | 139.1 | 139.5 | 139.3 |
| Crystallization rate [min] | 0.883 | 0.843 | 0.883 | 0.607 | 0.730 | 0.773 | 0.823 |
| Tensile modulus of elasticity [MPa] | 2,587 | 2,682 | 2,643 | 2,671 | 2,609 | 2,610 | 2,610 |
| Yield stress [MPa] | 62.19 | 63.95 | 63.05 | 63.76 | 63.52 | 62.63 | 63.18 |

Determination of Sizes of Primary Crystals

To determine the size of primary crystals, SE micrographs of the materials Purmol 4ST and Zeosorb 42 (see above) were prepared (cf. FIGS. 2-7). 30 particles from each material were randomly selected and tested. This gave the particle sizes listed in Table 4:

TABLE 4

| Particle No. | Purmol 4ST (Length in μm) | Zeosorb 42 (Länge in μm) |
|---|---|---|
| 1 | 2.70 | 1.65 |
| 2 | 2.60 | 1.68 |
| 3 | 1.65 | 1.53 |
| 4 | 2.34 | 1.60 |
| 5 | 2.59 | 1.20 |
| 6 | 2.65 | 1.60 |
| 7 | 1.14 | 1.68 |
| 8 | 1.69 | 1.43 |
| 9 | 2.79 | 1.39 |
| 10 | 2.23 | 1.31 |
| 11 | 2.46 | 1.12 |
| 12 | 2.19 | 1.37 |
| 13 | 2.28 | 1.37 |
| 14 | 1.83 | 0.97 |
| 15 | 2.41 | 1.36 |
| 16 | 1.94 | 1.32 |
| 17 | 2.42 | 2.09 |
| 18 | 2.15 | 1.31 |
| 19 | 2.35 | 0.84 |
| 20 | 2.88 | 1.38 |
| 21 | 2.78 | 1.88 |
| 22 | 2.25 | 1.65 |
| 23 | 3.27 | 1.19 |
| 24 | 2.56 | 1.68 |
| 25 | 1.84 | 1.23 |
| 26 | 2.68 | 1.01 |
| 27 | 1.74 | 1.94 |
| 28 | 2.54 | 1.02 |
| 29 | 1.47 | 1.25 |
| 30 | 2.13 | 1.70 |
| Average | 2.28 | 1.42 |
| Standard deviation | 0.47 | 0.30 |

TABLE 5

| | |
|---|---|
| A1 [% by weight] | 99.22 |
| D1 [% by weight] | 0.35 |
| D2 [% by weight] | 0.04 |
| D4 [% by weight] | 0.15 |
| D8 [% by weight] | 0.04 |
| B1 [% by weight] | 0.20 |
| Thermal test in $N_2$ (WL, %) | 0.03 |
| Thermal test in air (WL, %) | 1.30 |
| VDA 275 [ppm] | 8 |
| Tensile modulus of elasticity [MPa] | 2,431 |
| Yield stress [MPa] | 59.9 |

The invention claimed is:

1. A molding composition, comprising from 10 to 99.999% by weight of at least one polyoxymethylene as component (A1) and from 0.001 to 10% by weight of at least one zeolitic material, based on the weight of component (A1) present in said molding composition,
   wherein the pore diameter of said at least one zeolitic material is in the range of from 0.37 to 0.43 nm, as determined to DIN 66134 and DIN 66135,
   wherein the particle size of said at least one zeolitic material is in the range of from 3 to 7 μm, as determined to ISO 13320, and
   wherein the formaldehyde emission of said molding composition is 7 ppm or less, as determined to VDA 275.

2. The molding composition of claim 1, wherein said particle size is in the range of from 4 to 6 μm, as determined to ISO 13320.

3. The molding composition of claim 1, wherein said at least one zeolitic material is present in an amount of from 0.05 to 0.50% by weight, based on the weight of component (A1) present in said molding composition.

4. The molding composition of claim 1, wherein said at least one zeolitic material has a molar Si:Al ratio, calculated as molar $SiO_2:Al_2O_3$ ratio, in the range of up to 5:1.

5. The molding composition of claim 1, wherein the size of at least 90% of the primary crystals of said at least one zeolitic material is in the range from 1.5 to 3.0 μm, as determined by SEM.

6. The molding composition of claim 1, wherein at least 75% by weight of said at least one zeolitic material is not present in the H form.

7. The molding composition of claim 1, wherein said at least one zeolitic material has a molar Si:Al ratio, calculated as molar $SiO_2:Al_2O_3$ ratio, in the range of from 1:1 to 2:1; the size of at least 95% of the primary crystals of said at least one zeolitic material is in the range from 1.75 to 2.75 μm, as determined by SEM; and at least 95% by weight of said at least one zeolitic material is not present in the H form.

8. The molding composition of claim 1, wherein said molding composition does not comprise a spiro compound comprising at least one triazine ring.

9. The molding composition of claim 1, wherein said molding composition does not comprise an organic compound having a monodisperse molar mass distribution and comprising at least one primary amino group and/or at least one secondary amino group.

10. The molding composition of claim 1, further comprising from 0.005 to 2% by weight of a stabilizer as component (D1), based on the weight of component (A1).

11. The molding composition of claim 10, wherein said component (D1) is a sterically hindered phenol and the ratio by weight of said phenol to said zeolitic material is in the range of from 7:1 to 1:2.

12. The molding composition of claim 1, further comprising from 0.001 to 2% by weight of at least one polyamide as component (D2), based on the weight of component (A1).

13. The molding composition of claim 1, further comprising from 0.002 to 2% by weight of an alkaline earth metal silicate and/or of an alkaline earth metal glycerophosphate as component (D3), based on the weight of component (A1).

14. The molding composition of claim 1, further comprising from 0.01 to 5% by weight, based on the weight of component (A1), of:
   (1) at least one ester obtainable via reaction of at least one saturated or unsaturated aliphatic carboxylic acid having from 10 to 40 carbon atoms with at least one polyol or with at least one saturated aliphatic alcohol having from 2 to 40 carbon atoms; and/or
   (2) at least one amide obtainable via reaction of at least one saturated or unsaturated aliphatic carboxylic acid having from 10 to 40 carbon atoms with an amine having from 2 to 20 carbon atoms; and/or
   (3) at least one ether obtainable via reaction of at least one alcohol with at least one ethylene oxide;
   as component (D4).

15. The molding composition of claim 1, further comprising from 0.01 to 5% by weight of talc as component (C), based on the weight of component (A1).

16. The molding composition of claim 1, further comprising from 0.01 to 5% by weight of white oil as component (D8), based on the weight of component (A1).

17. The molding composition of claim 1, wherein said at least one polyoxymethylene is at least one polyoxymethylene homopolymer, or at least one polyoxymethylene copolymer, or a mixture of at least one polyoxymethylene homopolymer and at least one polyoxymethylene copolymer.

18. The molding composition of claim 1, further comprising up to 55% by weight of at least one polyurethane as component (A2), based on the weight of component (A1).

19. The molding composition of claim 18, wherein said at least one polyurethane is a thermoplastic polyester polyurethane having a Shore hardness A in the range of from 75 to 90, as determined to DIN 53505.

20. A process for reducing the formaldehyde emission of a molding composition comprising 10 to 99.999% by weight of at least one polyoxymethylene as component (A1) comprising incorporating 0.001 to 10% by weight of at least one zeolitic material, based on the weight of component (A1) present in said molding composition,
   wherein the pore diameter of said at least one zeolitic material is in the range of from 0.37 to 0.43 nm, as determined to DIN 66134 and DIN 66135,
   wherein the particle size of said at least one zeolitic material is in the range of from 3 to 7 μm, as determined to ISO 11320, and
   wherein the formaldehyde emission of said molding composition is 7 ppm or less, as determined to VDA 275.

21. The process of claim 20, wherein said molding composition does not comprise an organic compound having monodisperse molar mass distribution and comprising a primary amino group and/or secondary amino group as a constituent for reducing the formaldehyde emission of said molding composition.

22. A process for preparing the molding composition of claim 1, comprising mixing at least one polyoxymethylene with at least one zeolitic material, wherein the pore diameter of said at least one zeolitic material is in the range of from 0.37 to 0.43 nm, as determined to DIN 66134 and DIN 66135,
wherein the particle size of said at least one zeolitic material is in the range of from 3 to 7 μm, as determined to ISO 13320, and
wherein the formaldehyde emission of said molding composition is 7 ppm or less, as determined to VDA 275.

23. The process of claim 22, further comprising extruding said molding composition at a temperature in the range of from 100 to 270° C.

24. The process of claim 22, further comprising processing said molding composition to form a molding.

* * * * *